(12) United States Patent
Shinohara et al.

(10) Patent No.: US 10,986,483 B2
(45) Date of Patent: Apr. 20, 2021

(54) COMMUNICATION APPARATUS, COMMUNICATION METHOD, AND COMMUNICATION PROCESSING PROGRAM

(71) Applicant: Rakuten, Inc., Tokyo (JP)

(72) Inventors: Hiroshi Shinohara, Tokyo (JP); Yoshiro Matsuda, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 16/643,340

(22) PCT Filed: Aug. 30, 2017

(86) PCT No.: PCT/JP2017/031197
§ 371 (c)(1),
(2) Date: Feb. 28, 2020

(87) PCT Pub. No.: WO2019/043838
PCT Pub. Date: Mar. 7, 2019

(65) Prior Publication Data
US 2021/0067934 A1   Mar. 4, 2021

(51) Int. Cl.
*H04W 4/80* (2018.01)
(52) U.S. Cl.
CPC .................... *H04W 4/80* (2018.02)
(58) Field of Classification Search
CPC ....... H04W 4/80; H04W 4/022; H04W 48/04; H04M 1/72577
See application file for complete search history.

(56) References Cited

U.S. PATENT DOCUMENTS 10,305,611 B1 *  5/2019  Rimini ................. G01S 13/88
2008/0221742 A1 *  9/2008  DiCroce ................ B60R 25/24
701/2
(Continued)

FOREIGN PATENT DOCUMENTS

JP   2010-213334 A   9/2010

OTHER PUBLICATIONS

International Search Report for PCT/JP2017/031197 dated Nov. 14, 2017 (PCT/ISA/210).

*Primary Examiner* — Lewis G West
(74) *Attorney, Agent, or Firm* — Sughrue Mion, PLLC

(57) ABSTRACT

This communication apparatus C is provided with: a first communication unit which, after establishing a link necessary for first near field communication with a communication counterpart existing within a first communication available range, performs the first near field communication with the link-established communication counterpart; and a second communication unit which performs second near field communication with a communication counterpart existing within a second communication available range that is narrower than the first communication available range. And when it is detected that any one among a plurality of communication counterparts with which links are established has entered the second communication available range, the communication apparatus C limits the transmission and reception of data through the first near field communication with communication counterparts other than the communication counterpart detected to have entered the second communication available range, while maintaining the establishment of each link with each of the plurality of link-established communication counterparts.

8 Claims, 11 Drawing Sheets

(56) References Cited

U.S. PATENT DOCUMENTS

| | | | | |
|---|---|---|---|---|
| 2009/0005941 | A1* | 1/2009 | DeMarco | F16H 61/462 |
| | | | | 701/51 |
| 2014/0309913 | A1* | 10/2014 | Ricci | G08B 21/06 |
| | | | | 701/117 |
| 2016/0364579 | A1* | 12/2016 | Wilmes | H04W 12/02 |
| 2018/0070407 | A1* | 3/2018 | Ohhira | H04W 4/80 |
| 2020/0124169 | A1* | 4/2020 | Maurer | F16H 61/12 |
| 2020/0205056 | A1* | 6/2020 | Shinohara | H04W 76/25 |

* cited by examiner

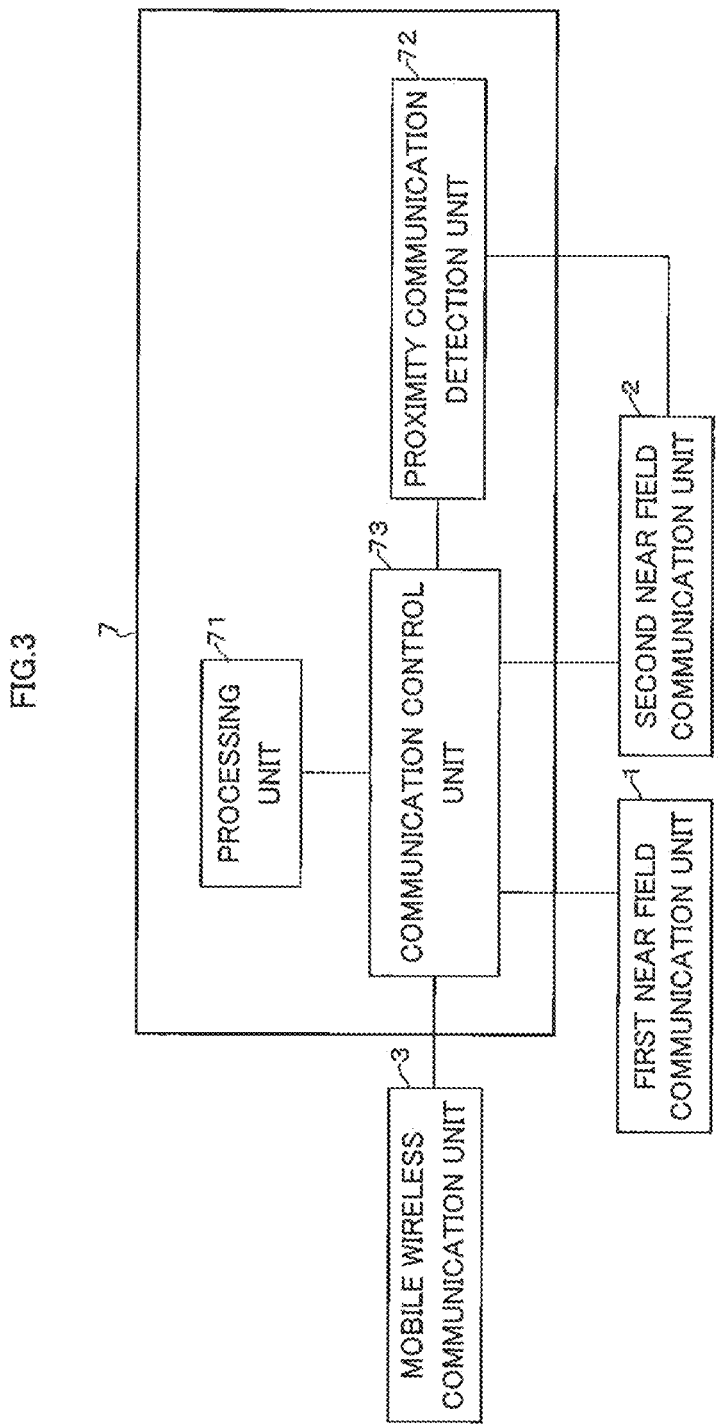

FIG.4(A)

COMMUNICATION PARTNER LIST
OF COMMUNICATION APPARATUS CM1

| IDENTIFICATION INFORMATION | COMMUNICATION RESTRICTION PRESENCE AND ABSENCE VALUE |
|---|---|
| S0000001 (CS1) | 0 (ABSENCE) |
| S0000002 (CS2) | 1 (PRESENCE) |
| S0000003 (CS3) | 1 (PRESENCE) |
| S0000004 (CS4) | 1 (PRESENCE) |

FIG.4(B)

COMMUNICATION PARTNER LIST
OF COMMUNICATION APPARATUS CS1

| IDENTIFICATION INFORMATION | COMMUNICATION RESTRICTION PRESENCE AND ABSENCE VALUE |
|---|---|
| M0000001 (CM1) | 0 (ABSENCE) |
| M0000002 (CM2) | 1 (PRESENCE) |
| M0000003 (CM3) | 1 (PRESENCE) |
| M0000004 (CM4) | 1 (PRESENCE) |

FIG.5(A)

COMMUNICATION PARTNER LIST
OF COMMUNICATION APPARATUS CM1

| IDENTIFICATION INFORMATION | COMMUNICATION RESTRICTION PRESENCE AND ABSENCE VALUE |
|---|---|
| S0000001 (CS1) | 0 (ABSENCE) |
| S0000002 (CS2) | 1 (PRESENCE) |
| S0000003 (CS3) | 1 (PRESENCE) |
| S0000004 (CS4) | 1 (PRESENCE) |

FIG.5(B)

COMMUNICATION PARTNER LIST
OF COMMUNICATION APPARATUS CM1

| IDENTIFICATION INFORMATION | COMMUNICATION RESTRICTION PRESENCE AND ABSENCE VALUE |
|---|---|
| S0000001 (CS1) | 1 (PRESENCE) |
| S0000002 (CS2) | 0 (ABSENCE) |
| S0000003 (CS3) | 1 (PRESENCE) |
| S0000004 (CS4) | 1 (PRESENCE) |

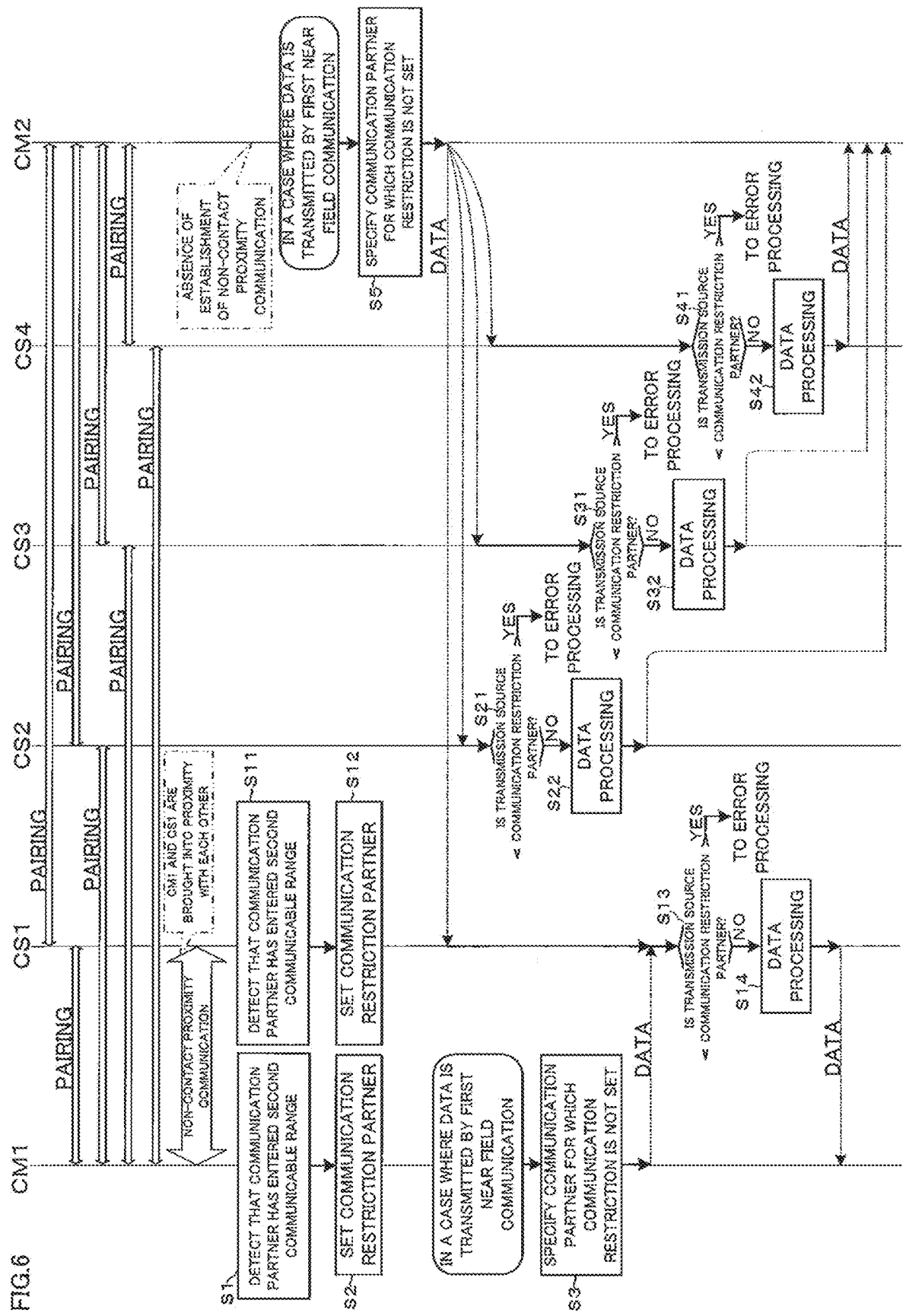

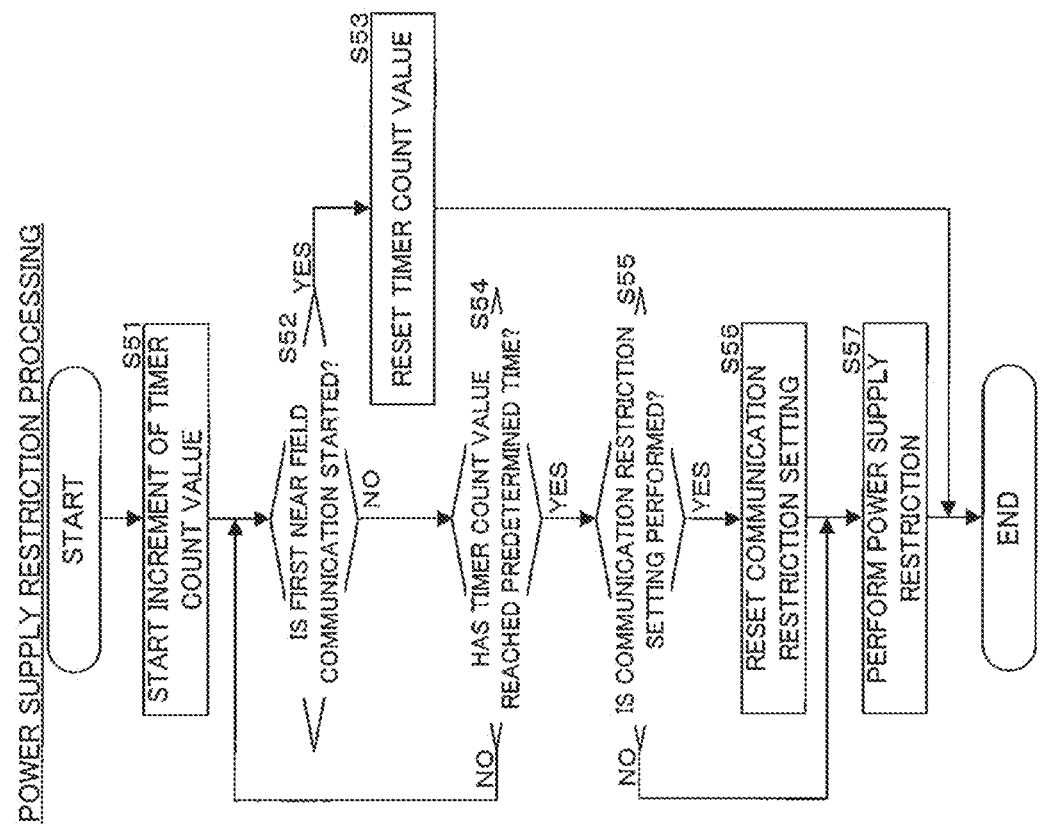

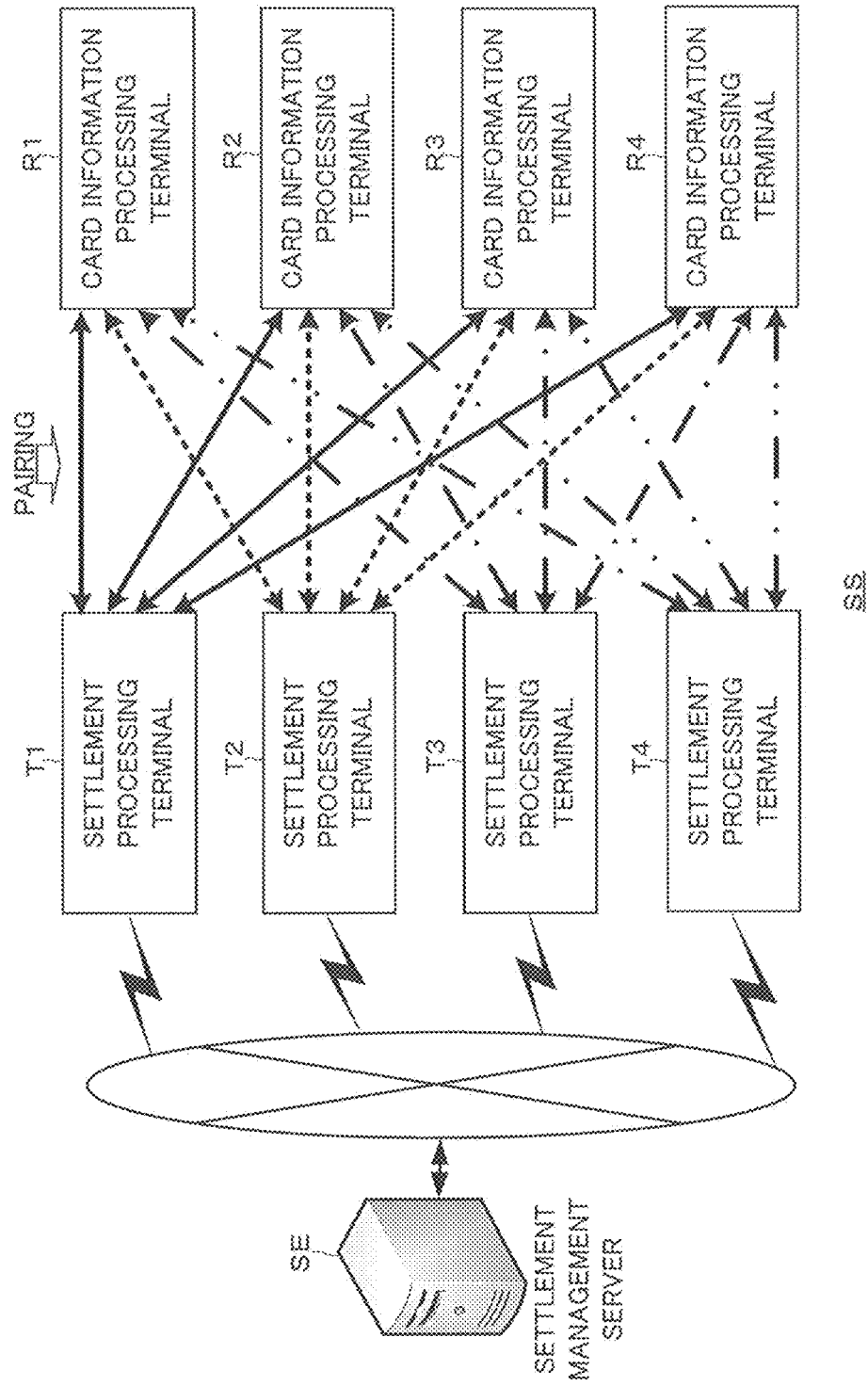

COMMUNICATION APPARATUS, COMMUNICATION METHOD, AND COMMUNICATION PROCESSING PROGRAM

CROSS REFERENCE TO RELATED APPLICATIONS

This application is a National Stage of International Application No. PCT/JP2017/031197 filed Aug. 30, 2017.

TECHNICAL FIELD

The present invention relates to the technical field of a communication system in which one communication apparatus can perform near field communication with each of a plurality of communication apparatuses.

BACKGROUND ART

Conventionally, wireless LAN standards such as Bluetooth (registered trademark) (hereinafter referred to as "BT") and Wi-Fi (registered trademark) are known as near field communication standards. For example, in the near field communication method based on BT, the communication apparatuses are classified into a master apparatus and a slave apparatus. Then, in the near field communication method based on BT, after a link is established (multipoint-connected) by pairing between one master apparatus and each of a plurality of slave apparatuses, the master apparatus can perform near field communication simultaneously with a plurality of slave apparatuses for which the link is established. Here, pairing means a procedure for establishing a link between the master apparatus and the slave apparatus (in other words, a procedure for associating the master apparatus and the slave apparatus). Then, once pairing is performed, the establishment of the link is maintained unless the pairing is removed even if the power of the master apparatus or the slave apparatus is turned off, for example, and near field communication can be performed immediately if the master apparatus and the slave apparatus are within a communicable range (communicable zone). Note that Patent Document 1 discloses a technology (handover technology), in which, for example, authentication information of a wireless LAN or BT is transmitted using an infrared communication method or a non-contact proximity communication method based on near field radio communication (NFC), and authentication setting of the wireless LAN or BT using the authentication information is performed, so that a user can automatically use a communication function related to the wireless LAN or BT without being conscious of the authentication processing and the setting processing.

CITATION LIST

Patent Document

Patent Document 1: Japanese Patent Application Laid-Open Publication No. JP 2010-213334 A

DISCLOSURE OF INVENTION

Problems to be Solved by the Invention

By the way, as described above, in the near field communication, maintaining the establishment of a link between a plurality of communication apparatuses is efficient because the time and the like of the user can be reduced. However, it may be necessary to perform near field communication only between specific two communication apparatuses in an arbitrary time zone during link establishment between one communication apparatus (for example, master apparatus) and each of a plurality of communication apparatuses (for example, slave apparatuses). Examples of such a case include a case where particularly quick processing is required in at least one of the two communication apparatuses, a case where it is particularly required to prevent the false recognition or confusion of the user who uses the communication apparatus, or a case where it is necessary to prevent the outflow of information exchanged between the two communication apparatuses. In such a case, the near field communication function of another communication apparatus not performing near field communication with the two communication apparatuses in the arbitrary time zone can be turned off by the user's operation. However, such operation is not efficient, and this becomes more remarkable as the number of other communication apparatuses for which a link is established with a specific communication apparatus increases.

Therefore, the present invention has been made in view of the above points and the like, and has an object to provide a communication apparatus, a communication method, and a communication processing program capable of efficiently restricting transmission and reception of data by near field communication with another communication apparatus not performing the near field communication in an arbitrary time zone, while maintaining establishment of links between a specific communication apparatus and each of a plurality of communication apparatuses (communication partners).

Solutions to the Problems

In order to solve the above described object, an invention according to claim 1 is characterized by comprising: a first communication unit that establishes a link necessary for first near field communication with a communication partner existing in a first communicable range, and then performs the first near field communication with the communication partner for which the link is established; a second communication unit that performs second near field communication with a communication partner existing in a second communicable range narrower than the first communicable range; a detection unit that detects that any one of a plurality of communication partners for which the link is established has entered the second communicable range; and a communication control unit that, in a case where the detection unit detects that the communication partner has entered the second communicable range, while maintaining establishment of the link with each of the plurality of communication partners for which the link is established, restricts transmission and reception of data by the first near field communication with the communication partners other than the communication partner whose entry into the second communicable range has been detected.

According to this invention, while maintaining the establishment of a link between a specific communication apparatus and each of a plurality of communication partners, transmission and reception of data by first near field communication with other communication partners not performing the first near field communication can be efficiently restricted in an arbitrary time zone.

The invention according to claim 2 is characterized by the communication apparatus according to claim 1, wherein, in a case where the detection unit further detects that the communication partner whose transmission and reception of data by the first near field communication is restricted has entered the second communicable range, while maintaining the establishment of the link with each of the plurality of communication partners for which the link is established, the communication control unit removes restriction of the transmission and reception of data with the communication partner whose entrance to the second communicable range has been further detected, and restricts transmission and reception of data by the first near field communication with the communication partners other than the communication partner whose restriction of the transmission and reception of data has been removed.

According to this invention, in a specific communication apparatus, it is possible to switch quickly and efficiently a communication partner of which transmission and reception of data by the first near field communication is not restricted.

The invention according to claim 3 is characterized by the communication apparatus according to claim 1 or 2, wherein the communication control unit does not respond to a predetermined command by the first near field communication from the communication partner whose transmission and reception of data by the first near field communication is restricted.

According to this invention, in a specific communication apparatus, even in a case where data indicating a predetermined command is received by the first near field communication from a communication partner whose transmission and reception of data by the first near field communication is restricted, transmission and reception of data by the first near field communication with the communication partner can be efficiently restricted by not responding to the command.

The invention according to claim 4 is characterized by the communication apparatus according to any one of claims 1 to 3, further comprising a battery that supplies power to each unit comprised in the communication apparatus, wherein, in a case where a state in which the first near field communication is not performed with any of the plurality of communication partners for which the link is established continues for a predetermined time, while maintaining establishment of the link with each of the plurality of communication partners for which the link is established, the communication control unit switches a power consumption mode of the battery from a normal mode to a power saving mode, and thereafter, in a case where the detection unit detects that any one of the plurality of communication partners for which the link is established has entered the second communicable range, the communication control unit switches the power consumption mode of the battery from the power saving mode to the normal mode, and restricts transmission and reception of data by the first near field communication with the communication partners other than the communication partner whose entrance to the second communicable range has been detected.

According to this invention, in a specific communication apparatus, while preventing the power consumption of a battery, transmission and reception of data by first near field communication with other communication partners not performing the first near field communication can be efficiently restricted in an arbitrary time zone.

The invention according to claim 5 is characterized by the communication apparatus according to claim 4, wherein, in a case where the state in which the first near field communication is not performed with any of the plurality of communication partners for which the link is established continues for the predetermined time, while maintaining establishment of the link with each of the plurality of communication partners for which the link is established, the communication control unit switches a power consumption mode of the battery from a normal mode to a power saving mode, and removes the restriction with all the communication partners whose transmission and reception of data by the first near field communication has been restricted.

According to this invention, in a specific communication apparatus, it is possible to efficiently reset the restriction of transmission and reception of data by the first near field communication.

The invention according to claim 6 is characterized by the communication apparatus according to any one of claims 1 to 5, wherein, in a case where the detection unit detects that the communication partner has entered the second communicable range, the communication control unit acquires a remaining power amount of a battery of the communication partner whose entrance to the second communicable range has been detected, and in a case where the remaining power amount acquired is less than a threshold, the communication control unit notifies that the remaining power amount of the battery of the communication partner is small.

According to this invention, in a specific communication apparatus, it is possible to exclude a communication partner whose remaining power amount of the battery is less than a threshold as a communication partner whose transmission and reception of data by the first near field communication is not restricted.

An invention according to claim 7 is characterized by comprising: a step of establishing a link necessary for first near field communication with a communication partner existing in a first communicable range, and then performing the first near field communication with the communication partner for which the link is established; a step of performing second near field communication with a communication partner existing in a second communicable range narrower than the first communicable range; a step of detecting that any one of a plurality of communication partners for which the link is established has entered the second communicable range; and a step of, in a case where it is detected that the communication partner has entered the second communicable range, while maintaining establishment of the link with each of the plurality of communication partners for which the link is established, restricting transmission and reception of data by the first near field communication with the communication partners other than the communication partner whose entry into the second communicable range has been detected.

An invention according to claim 8 is characterized by comprising: a first communication unit that establishes a link necessary for first near field communication with a communication partner existing in a first communicable range, and then performs the first near field communication with the communication partner for which the link is established; and a second communication unit that performs second near field communication with a communication partner existing in a second communicable range narrower than the first communicable range, to function as a detection unit that detects that any one of a plurality of communication partners for which the link is established has entered the second communicable range, and a communication control unit that, in a case where the detection unit detects that the communication partner has entered the second communicable range, while maintaining establishment of the link with each of the plurality of communication partners for which the link is established, restricts transmission and reception of data by the first near field communication with the communication partners other than the communication partner whose entry into the second communicable range has been detected.

Effects of the Invention

According to the present invention, while maintaining establishment of a link between a specific communication apparatus and each of a plurality of communication partners, transmission and reception of data by first near field communication of other communication partners that do not perform near field communication can be efficiently limited in an arbitrary time zone.

BRIEF DESCRIPTION OF THE DRAWINGS

FIG. 3 is a figure illustrating an example of functional blocks of a control unit 7.

FIG. 4(A) is a figure illustrating an example of a communication partner list of the control unit 7 of a communication apparatus CM1, and FIG. 4(B) is a figure illustrating an example of the communication partner list of the control unit 7 of the communication apparatus CS1.

FIGS. 5(A) and 5 (B) are figures illustrating an example of update of the communication partner list of the control unit 7 of the communication apparatus CM1.

FIG. 6 is a sequence figure illustrating an example of basic operation of the communication system S.

FIG. 7 is a flowchart illustrating an example of power supply restriction processing in the control unit 7 of the communication apparatus C.

FIG. 8 is a figure illustrating an example of a schematic configuration of a settlement system SS.

EMBODIMENTS FOR CARRYING OUT THE INVENTION

Hereinafter, embodiments of the present invention will be described with reference to the figures. The embodiment described below is an embodiment in a case where the present invention is applied to a communication system in which one communication apparatus can perform near field communication with each of a plurality of communication apparatuses.

[1. Overview of Communication System S]

Figure 1:
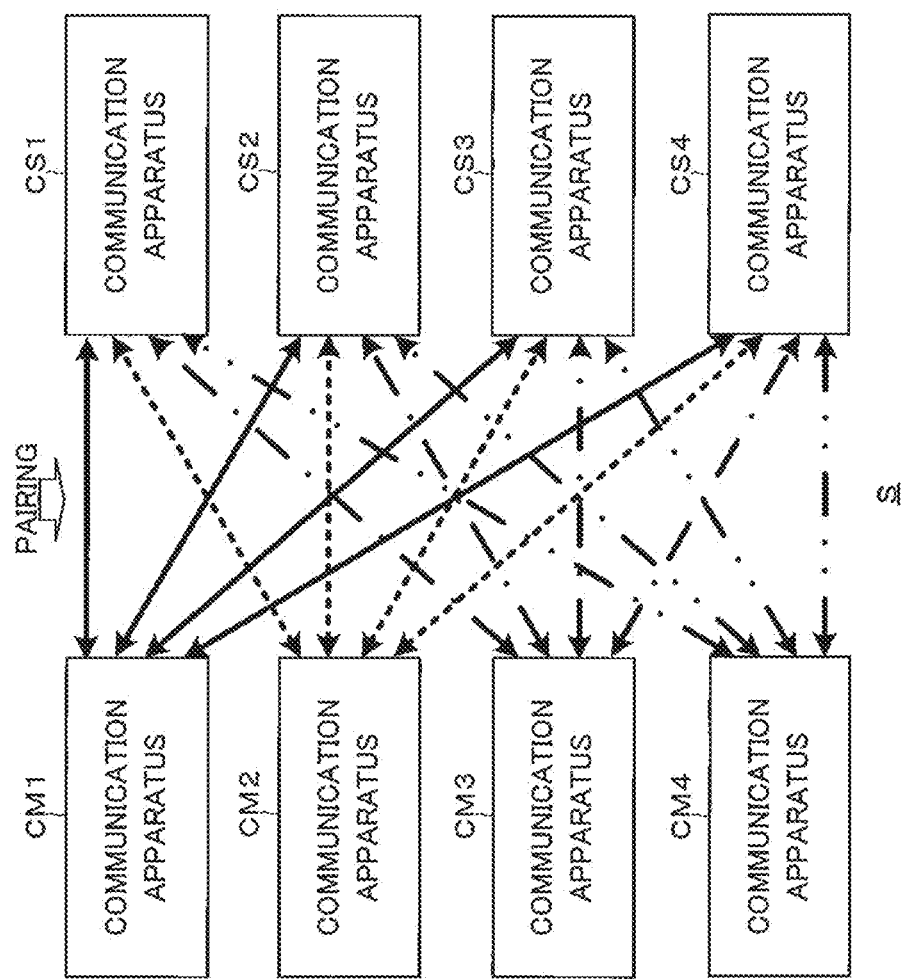
FIG. 1 is a figure illustrating an example of a schematic configuration of a communication system S.

First, referring to FIG. 1, the outline of the communication system S will be described. FIG. 1 is a figure illustrating an example of a schematic configuration of the communication system S. In the example of FIG. 1, the communication system S comprises communication apparatuses CMn (n=1, 2, 3, 4), communication apparatuses CSm (m=1, 2, 3, 4), and the like. Note that the communication apparatus CMn and the communication apparatus CSm are collectively referred to as a communication apparatus C. The number of communication apparatuses C is not particularly limited. Furthermore, the communication partner of the communication apparatus CMn is the communication apparatus CSm, and the communication partner of the communication apparatus CSm is the communication apparatus CMn.

The communication apparatus C adopts a plurality of types of near field communication methods having different communicable ranges (in other words, communicable distances). For example, the communication apparatus C adopts a near field communication (hereinafter referred to as "first near field communication") method based on BT, and a near field communication (hereinafter referred to as "second near field communication (non-contact proximity communication)") method based on NFC. The first near field communication method is a wireless communication technology using a 2.4 GHz band, and the communicable distance (maximum) thereof is set between 10 m and 100 m (for example, set to about 10 m). In the first near field communication method, for example, 79 channels having a frequency bandwidth of 1 MHz are set, and a frequency hopping spread spectrum technique of switching the channels 1600 times per second is adopted. On the other hand, the second near field communication method is a wireless communication (non-contact proximity communication) technology (a type of radio frequency identification (RFID) technology) using 13.56 MHz band, and the communicable distance (maximum) thereof is about several cm. Therefore, the communicable range based on NFC (hereinafter, referred to as "second communicable range") is narrower than the communicable range based on BT (hereinafter, referred to as "first communicable range").

The communication apparatus CMn corresponds to a master apparatus in the first near field communication method. On the other hand, the communication apparatus CSm corresponds to a slave apparatus in the first near field communication method. The communication apparatus CMn determines the frequency hopping pattern according to the processing content, and the communication apparatus CSm is controlled by the communication apparatus CMn (that is, the master apparatus has the initiative of the first near field communication). In the example of FIG. 1, each communication apparatus CMn establishes a link by pairing with each communication apparatus CSm (multipoint-connected), and performs the first near field communication with the communication apparatuses CSm existing in the first communicable range. In the present embodiment, it is assumed that at least two or more communication apparatuses CSm exist (that is, are included) in the first communicable range of one communication apparatus CMn. For example, the communication apparatus CM1 establishes the link (that is, the link necessary for the first near field communication) with each of the communication apparatuses CS1 to CS4. Then, for example, in a case where the communication apparatuses CS1, CS2, and CS3 among the communication apparatuses CS1 to CS4 exist in the first communicable range of the communication apparatus CM1, the communication apparatus CM1 can perform first near field communication simultaneously with each of the communication apparatuses CS1, CS2, and CS3.

Furthermore, the communication apparatus CMn performs second near field communication (non-contact proximity communication) with the communication apparatus CSm existing in the second communicable range. In the present embodiment, it is assumed that one communication apparatus CSm enters the second communicable range of one communication apparatus CMn. For example, in a case where the communication apparatus CM1 detects that the communication apparatus CS1 among the communication apparatuses CS1 to CS4 for which the link is established has entered the second communicable range (that is, the second communicable range of the communication apparatus CM1), while maintaining the establishment of the link with each of the communication apparatuses CS1 to CS4 for which the link is established, the communication apparatus CM1 restricts transmission and reception of data by the first near field communication with communication apparatuses CS2 to CS4 other than the communication apparatus CS1 whose entrance to the second communicable range has been detected. For example, communication restriction setting is performed in which the communication apparatuses CS2 to CS4 are set as communication restriction partners. At this time, the communication apparatus CS1 detects that the communication apparatus CM1 has entered the second communicable range (that is, the second communicable range of the communication apparatus CS1), while maintaining the establishment of the link with each of the communication apparatuses CM1 to CM4 for which the link has been established, the communication apparatus CS1 restricts transmission and reception of data by the first near field communication with the communication apparatuses CM2 to CM4 other than the communication apparatus CM1 whose entrance to the second communicable range has been detected. For example, communication restriction setting is performed in which the communication apparatuses CM2 to CM4 are set as communication restriction partners. As a result, it is possible to perform the first near field communication only between two specific communication apparatuses CM1 and CS1 in an arbitrary time zone.

Here, examples of "restricting transmission and reception of data by the first near field communication" include not transmitting regular data to the communication restriction partner by the first near field communication. The regular data is data necessary for processing in the communication apparatus C (in other words, regular data is data for causing the processing to proceed normally). Examples of the regular data in this case include command data (data indicating a predetermined command) for the communication partner. The command data may include data to be processed (for example, data before or after processing). As a result, for example, the communication apparatus CM1 transmits command data by the first near field communication only to the communication apparatus CS1 existing in the first communicable range. In other words, even in a case where the communication apparatuses CS2 to CS4, which are communication restriction partners, exist in the first communicable range, the communication apparatus CM1 does not transmit command data to the communication restriction partners by the first near field communication. Note that examples of non-regular data include error message data, of which transmission and reception by the first near field communication may not be restricted.

Furthermore, another example of "restricting transmission and reception of data by the first near field communication" is not-receiving regular data transmitted from the communication restriction partner by the first near field communication. "Not receiving the regular data" means, for example, that an application (software) installed on the communication apparatus C does not receive (or discards) the regular data. Examples of the regular data in this case include command data from the communication restriction partner. As a result, for example, even in a case where the communication apparatus CS1 receives command data from the communication apparatuses CM2 to CM4, which are communication restriction partners, by the first near field communication (received by the near field communication function based on BT), the communication apparatus CS1 does not respond to the command and does not send back response data to the command (or sends back error message data indicating that the communication apparatus CS1 cannot respond to the command). In other words, the communication apparatus CS1 performs processing according to the command only in a case where the command data is received from the communication apparatus CM1 that is not the communication restriction partner by the first near field communication, and sends back response data to the command (for example, response data indicating the processing result). As a result, the communication apparatus CS1 can efficiently restrict transmission and reception of data by the first near field communication with the communication apparatuses CM2 to CM4 which are communication restriction partners.

Note that, after establishment of the link by pairing, in a case where a logical communication path (connection) is established before transmission and reception of data by the first near field communication, "restricting transmission and reception of data by the first near field communication" may be rejection of establishment of the logical communication path.

In addition, for example, in a case where the communication apparatus CM1 further detects that the communication apparatus CS2 of which transmission and reception of data by the first near field communication is restricted has entered the second communicable range (that is, the second communicable range of the communication apparatus CM1), while maintaining the establishment of the link with each of the communication apparatuses CS1 to CS4 for which the link is established, the communication apparatus CM1 removes the restriction of transmission and reception of data with the communication apparatus CS2 whose entrance to the second communicable range has been further detected (for example, removes the communication restriction setting of the communication apparatus CS2), and restricts transmission and reception of data by the first near field communication with the communication apparatuses CS1 and the CS3 to CS4 other than the communication apparatus CS2 whose restriction of transmission and reception of data is removed. As a result, the communication apparatus CM1 can switch quickly and efficiently a communication partner whose transmission and reception of data by the first near field communication is not restricted. At this time, the communication apparatus CS2 detects that the communication apparatus CM1 has entered the second communicable range (that is, the second communicable range of the communication apparatus CS2), while maintaining the establishment of the link with each of the communication apparatuses CM1 to CM4 for which the link is established, the communication apparatus CS2 restricts transmission and reception of data by the first near field communication with communication apparatuses CM2 to CM4 other than the communication apparatus CM1 whose entrance to the second communicable range has been detected.

Note that, in a case where the communication restriction setting (for example, setting of communication apparatuses CM1 to CM3 as communication restriction partners) has already been performed when the communication apparatus CS2 detects that the communication apparatus CM1 has entered the second communicable range, while maintaining the establishment of the link with each of the communication apparatuses CM1 to CM4 for which the link is established, the communication apparatus CS2 removes the restriction of transmission and reception of data with the communication apparatus CM1 whose entrance to the second communicable range has been further detected (for example, removes the communication restriction setting of the communication apparatus CM1), and restricts transmission and reception of data by the first near field communication with the communication apparatuses CM2 to CM4 other than the communication apparatus CM1 whose restriction of transmission and reception of data is removed.

[2. Configuration and Function of Communication Apparatus C]

Figure 2:
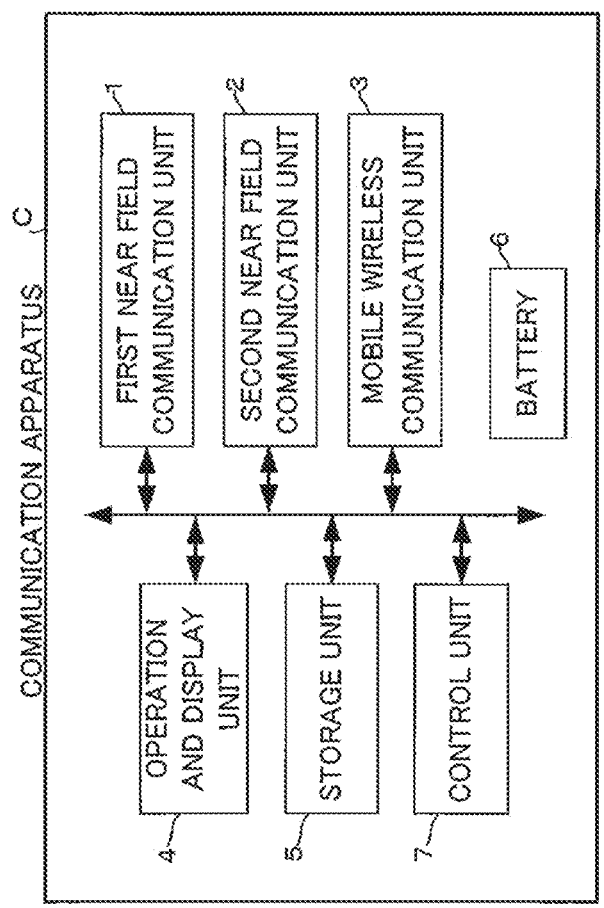
FIG. 2 is a figure illustrating an example of a schematic configuration of a communication apparatus C.

Next, referring to FIG. 2 or the like, the configuration and function of the communication apparatus C will be described. FIG. 2 is a figure illustrating an example of a schematic configuration of the communication apparatus C. As illustrated in FIG. 2, the communication apparatus C comprises a first near field communication unit 1, a second near field communication unit 2, a mobile wireless communication unit 3, an operation and display unit 4, a storage unit 5, a battery 6, a control unit 7 that controls each of these units, and the like. Note that the communication apparatus C may comprise an audio processing unit and a speaker. The first near field communication unit 1 is an example of a first communication unit in the present invention, the second near field communication unit 2, and an example of the first communication unit in the present invention.

The first near field communication unit 1 is connected to an antenna (not illustrated) for the first near field communication, and in the first near field communication unit 1, an apparatus address unique to each of the first near field communication unit 1 of each communication apparatus C is stored in advance. The first near field communication unit 1 (e.g., BT transceiver circuitry) has a near field communication function based on BT, establishes a link by pairing with the first near field communication unit 1 of the communication partner existing in the first communicable range, and then performs the first near field communication with the first near field communication unit 1 of the communication partner for which the link is established.

In this pairing, authentication information (such as a public key) of each other is exchanged between the first near field communication units 1 of both the communication apparatus CMn and the communication apparatus CSm so that the mutual authentication is performed, and when the mutual authentication is successful, a shared key (link key or long term key) is generated. Then, the generated shared key is stored (bonded) in the first near field communication units 1 of both the communication apparatus CMn and the communication apparatus CSm. At this time, the apparatus address of the first near field communication unit 1 of the communication partner is stored in association with a common key in the first near field communication units 1 of both. The shared key thus stored is used to encrypt or decrypt data of the packet (data in the payload portion of the packet) transmitted in the first near field communication after pairing. A common profile (which defines the protocol of the first near field communication) is stored in the first near field communication units 1 of both the communication apparatus CMn and the communication apparatus CSm to be paired. Examples of such profiles include Generic Access Profile (GAP), File Transfer Profile (FTP), Generic ATTribute profile (GATT) and the like.

The second near field communication unit 2 is connected to an antenna (not illustrated) for the second near field communication. The second near field communication unit 2 (e.g., NFC transceiver circuitry) has a near field communication function based on NFC, and performs second near field communication (non-contact proximity communication) with a second near field communication unit 2 of a communication partner existing in a second communicable range narrower than the first communicable range. In the present embodiment, the second near field communication unit 2 may be set to a peer-to-peer (P2P) mode. For example, in a case where the communication apparatus CMn and the communication apparatus CSm enter the second communicable range of each other, the second near field communication unit 2 of the communication apparatus CMn and the second near field communication unit 2 of the communication apparatus CSm mutually detect to establish non-contact proximity communication, and exchange pieces of identification information of each other. The exchange of identification information can be realized, for example, by writing identification information in a tag defined in the NFC data exchange format (NDEF). Then, for example, identification information acquired by the second near field communication unit 2 of the communication apparatus CMn (that is, identification information of the communication apparatus CSm) is output to the control unit 7 of the communication apparatus CMn. On the other hand, identification information acquired by the second near field communication unit 2 of the communication apparatus CSm (that is, identification information of the communication apparatus CMn) is output to the control unit 7 of the communication apparatus CSm. Note that examples of the identification information of the communication apparatus C include an apparatus address of the first near field communication unit 1 mounted on the communication apparatus C. However, the identification information of the communication apparatus C may be other information such as the MAC address of the communication apparatus C, as long as the information can uniquely identify the communication apparatus C. In this case, such information is linked to the apparatus address of the first near field communication unit 1.

The mobile wireless communication unit 3 is connected to an antenna (not illustrated) for mobile wireless communication. The mobile wireless communication unit 3 has a wireless communication function using a mobile communication network. The mobile communication network includes, for example, a telephone circuit switched network and a data communication packet switched network for connecting to the Internet. The mobile wireless communication unit 3 performs wireless communication with the nearest base station via an antenna (not illustrated), and communicates with a predetermined server via the base station and the mobile communication network.

The operation and display unit 4 comprises an input function for accepting an operation instruction by a finger of a user of the communication apparatus C, a pen, or the like and a touch panel having a screen for displaying information. The operation and display unit 4 accepts an operation instruction from the user, and outputs an operation instruction signal according to the operation instruction to the control unit 7.

The storage unit 5 comprises, for example, a non-volatile memory, and stores an operating system (OS), an application, and the like. The application is an application instance installed in an executable state by developing an application program (including the communication processing program of the present invention) or the like in a memory. Note that the application program may be downloaded to the communication apparatus C from a predetermined server, or may be recorded (recorded readably by a computer) on a recording medium such as a CD or DVD so as to be read from the recording medium and stored in the storage unit 6.

The battery 6 is a power supply of the communication apparatus C, and can charge the power for operating the communication apparatus C from the outside. The battery 6 supplies power to each unit of the communication apparatus C under the control of the control unit 7. Note that the power consumption state of the battery 6 is monitored by the control unit 7. For example, the control unit 7 monitors the power consumption state by measuring the current current consumption rate on the basis of the output current value of the battery 6. Furthermore, the control unit 7 monitors the remaining power amount of the battery 6 (for example, the battery remaining rate). Furthermore, the battery 6 can switch the power consumption mode from the normal mode to the power saving mode under the control of the control unit 7. In the power saving mode, for example, the brightness of the screen in the operation and display unit 4 is set to be darker than in the normal mode, and the time until the sleep state is set to be shorter than in the normal mode. Note that, in the power saving mode, the power supply from the battery 6 to the units other than the control unit 7 may be turned off.

The control unit 7 comprises a Central Processing Unit (CPU), a Read Only Memory (ROM), a Random Access Memory (RAM), and the like. The control unit 7 (processor in the control unit 7) functions as a processing unit 71, a proximity communication detection unit 72, a communication control unit 73, and the like according to an application executed on the OS. Furthermore, the control unit 7 performs on and off control of the power supply of the battery 6 (that is, on and off control of the power). FIG. 3 is a figure illustrating an example of functional blocks of the control unit 7. Note that the proximity communication detection unit 72 is an example of a detection unit in the present invention, and the communication control unit 73 is an example of a communication control unit in the present invention. Note that the second near field communication unit 2 may be a detection unit in the present invention.

The processing unit 71 performs predetermined processing according to the operation instruction signal from the operation and display unit 4, or according to the data (for example, command data or response data) received by the first near field communication unit 1, the second near field communication unit 2, or the mobile wireless communication unit 3. Note that the data received by the first near field communication unit 1, the second near field communication unit 2, or the mobile wireless communication unit 3 is output to the processing unit 71 via the communication control unit 73. Furthermore, the data processed by the processing unit 71 is output to the first near field communication unit 1, the second near field communication unit 2, or the mobile wireless communication unit 3 via the communication control unit 73.

The proximity communication detection unit 72 acquires the identification information from the second near field communication unit 2 to detect that the communication partner corresponding to the identification information (that is, any one of the plurality of communication partners for which the link is established) has entered the second communicable range. Note that the identification information acquired by the proximity communication detection unit 72 is passed to the communication control unit 73.

The communication control unit 73 controls transmission and reception of data by each of the first near field communication unit 1, the second near field communication unit 2, and the mobile wireless communication unit 3. The communication control unit 73 can perform control such as performing pairing, removing pairing (deletion of a shared key generated by pairing), on and off of a near field communication function based on BT, and on and off of a near field communication function based on NFC, according to an operation instruction signal from the operation and display unit 4.

Furthermore, in a case where the proximity communication detection unit 72 detects that the communication partner has entered the second communicable range, while maintaining the establishment of the link with each of a plurality of communication partners for which the link is established (that is, maintaining the establishment of the link by not removing the pairing), the communication control unit 73 restricts transmission and reception of data by the first near field communication with a communication partner other than the communication partner whose entrance to the second communicable range has been detected (that is, the communication partner corresponding to the acquired identification information). For example, the communication control unit 73 performs communication restriction setting for setting the communication restriction partner using the communication partner list for registering the information of the communication partner for which the link is established, and the identification information acquired through the second near field communication unit 2. Such a communication partner list is stored, for example, in the RAM of the control unit 7.

FIG. 4(A) is a figure illustrating an example of the communication partner list being had by the control unit 7 of the communication apparatus CM1, and FIG. 4(B) is a figure illustrating an example of the communication partner list being had by the control unit 7 of the communication apparatus CS1. In the communication partner list illustrated in FIG. 4(A), the identification information (identification information of the communication partner) of each of the communication apparatuses CS1 to CS4 for which the link is established with the communication apparatus CM1, and the communication restriction presence and absence value are associated with each other and registered. The identification information registered in the communication partner list is acquired at the time of pairing. In the communication partner list illustrated in FIG. 4(A), the communication apparatuses CS2 to CS4 are subjected to the communication restriction setting as communication restriction partners (communication restriction presence and absence value=1 (presence)). That is, in this example, the communication control unit 73 of the communication apparatus CM1 performs communication restriction setting by setting the communication restriction presence and absence value associated with identification information other than the identification information of the communication apparatus CS1 whose entrance to the second communicable range has been detected (that is, the acquired identification information) to "1". On the other hand, in the communication partner list illustrated in FIG. 4(B), the identification information of each of the communication apparatuses CM1 to CM4 for which the link is established with the communication apparatus CS1, and the communication restriction presence and absence value are associated with each other and registered. In the communication partner list illustrated in FIG. 4(B), the communication apparatuses CM2 to CM4 are subjected to the communication restriction setting as communication restriction partners (communication restriction presence and absence value=1 (presence)).

Furthermore, in a case where the proximity communication detection unit 72 further detects that the communication restriction partner whose communication restriction is set has entered the second communicable range after the communication restriction setting, while maintaining the establishment of the link with each of a plurality of communication partners (including communication restriction partners) for which the link is established, the communication control unit 73 removes the restriction of data transmission and reception of data with the communication restriction partner whose entrance to the second communicable range has been further detected (that is, removes the communication restriction setting for the communication restriction partner), and restricts the transmission and reception of data by the first near field communication with a communication partner other than the communication partner whose restriction of transmission and reception of data has been removed. For example, the communication control unit 73 updates the communication restriction setting using the communication partner list.

FIGS. 5 (A) and 5 (B) are figures illustrating an example of update of the communication partner list of the control unit 7 of the communication apparatus CM1. As illustrated in FIG. 5(B), the communication restriction setting is updated in the communication partner list illustrated in FIG. 5(A). That is, in this example, the communication control unit 73 of the communication apparatus CM1 updates the communication restriction setting by changing the communication restriction presence and absence value "1" associated with the identification information of the communication apparatus CS2 whose entrance to the second communicable range has been further detected to "0" (that is, removes the control), and setting the communication restriction presence and absence value associated with identification information other than the identification information of the communication apparatus CS2 to "1". Note that this update includes one in which the communication restriction presence and absence value is maintained at "1", such as the communication apparatuses CS3 and CS4.

Then, when transmitting data by the first near field communication, the communication control unit 73 specifies a communication partner whose communication restriction is not set from the communication partner list (that is, specifies identification information of the communication partner (for example, the apparatus address of the first near field communication unit 1 mounted on the communication partner)), and outputs the data and the specified identification information to the first near field communication unit 1. As a result, the first near field communication unit 1 packetizes the data output from the communication control unit 73, sets the identification information output from the communication control unit 73 as the destination of the header portion of the packet, sets the identification information of the communication apparatus C which is the transmission source as the transmission source of the header portion, and transmits to the communication partner for which the link is established and existing in the first communicable range. In this case, the data in the payload portion of the packet transmitted by the first near field communication unit 1 is encrypted by the shared key associated with the identification information output from the communication control unit 73 and transmitted.

On the other hand, in a case where the data of the packet received by the first near field communication unit 1 is input, the communication control unit 73 determines whether the transmission source of the data is the communication restriction partner on the basis of the communication partner list. In other words, it is determined whether the communication partner corresponding to the identification information set as the transmission source of the header portion of the packet is set for communication restriction. For example, in the communication partner list, in a case where the communication restriction presence and absence value "1" is associated with the identification information set as the transmission source of the header portion of the packet, it is determined that the communication partner is set for communication restriction. In this case, the communication control unit 73 does not pass the received packet data to the processing unit 71, and performs error processing (for example, discarding the data). On the other hand, in a case where the communication control unit 73 determines that the communication partner is not set for communication restriction, the communication control unit 73 passes the data of the received packet to the processing unit 71 for processing.

Note that the communication control unit 73 measures, by using a timer, the duration of the state in which the first near field communication is not performed with any of the plurality of communication partners for which the link is established, and in a case where the state where the first near field communication is not performed continues for a predetermined time, while maintaining the establishment of the link with each of the plurality of communication partners for which the link is established, the communication control unit 73 may switch the power consumption mode of the battery 6 from the normal mode to the power saving mode (power supply restriction). At this time, in a case where the communication restriction setting is made for any of the plurality of communication partners for which the link is established, the communication control unit 73 may reset the communication restriction setting. Thus, after the power consumption mode of the battery 6 is switched to the power saving mode, in a case where the proximity communication detection unit 72 detects that any one communication partner among a plurality of communication partners for which the link is established has entered the second communicable range, the communication control unit 73 switches the power consumption mode of the battery 6 from the power saving mode to the normal mode, and restricts transmission and reception of data by the first near field communication with a communication partner other than the communication partner whose entrance to the second communicable range has been detected.

[3. Basic Operation of Communication System S]

Next, referring to FIG. 6, the basic operation of the communication system S will be described. FIG. 6 is a sequence figure illustrating an example of basic operation of the communication system S. In the example of FIG. 6, each of the communication apparatuses CM1 and CM2 establishes a link by pairing with each of the communication apparatuses CS1 to CS4. Note that, although illustration of the communication apparatuses CM3 and CM4 is omitted, each of the communication apparatuses CM3 and CM4 establishes a link by pairing with each of the communication apparatuses CS1 to CS4.

As illustrated in FIG. 6, in a case where the communication apparatus CM1 and the communication apparatus CS1 approach each other to be within the second communicable range of each other, the second near field communication unit 2 of the communication apparatus CM1 and the second near field communication unit 2 of the communication apparatus CS1 mutually detect to establish non-contact proximity communication, and exchange pieces of identification information of each other. As a result, the proximity communication detection unit 72 of the communication apparatus CM1 acquires the identification information of the communication apparatus CS1, and detects that the communication apparatus CS1 has entered the second communicable range (step S1). Next, while maintaining the establishment of the link with each of the communication apparatuses CS1 to CS4, the communication control unit 73 of the communication apparatus CM1 sets the communication apparatuses CS2 to CS4 as the communication restriction partners (performs communication restriction setting) using the identification information of the communication apparatus CS1 detected in step S1 and the communication partner list (step S2). Such communication restriction setting is maintained even in a case where the communication apparatus CM1 and the communication apparatus CS1 go out of the second communicable range of each other.

On the other hand, the proximity communication detection unit 72 of the communication apparatus CS1 acquires the identification information of the communication apparatus CM1, and detects that the communication apparatus CM1 has entered the second communicable range (step S11). Next, while maintaining the establishment of the link with each of the communication apparatuses CM1 to CM4, the communication control unit 73 of the communication apparatus CS1 sets the communication apparatuses CM2 to CM4 as the communication restriction partners using the identification information of the communication apparatus CM1 detected in step S11 and the communication partner list (step S12).

Thereafter, in a case where the processing unit 71 of the communication apparatus CM1 performs predetermined processing (not illustrated) according to the operation instruction signal or the like, and transmits data (for example, command data) according to the processing by the first near field communication, the communication control unit 73 of the communication apparatus CM1 specifies the communication apparatus CS1 from the communication partner list as a communication partner whose communication restriction is not set (step S3). The identification information of the communication apparatus CS1 thus specified and the data corresponding to the above processing are output to the first near field communication unit 1. Then, the first near field communication unit 1 of the communication apparatus CM1 transmits the data output from the communication control unit 73 to the communication apparatus CS1 by the first near field communication.

Thus, the data transmitted from the communication apparatus CM1 by the first near field communication is received by the first near field communication unit 1 of the communication apparatus CS1, and is output to the communication control unit 73 of the communication apparatus CS1. The communication control unit 73 of the communication apparatus CS1 determines whether the transmission source of the received data is the communication restriction partner on the basis of the communication partner list (step S13). In the example of FIG. 6, since the transmission source of the received data is the communication apparatus CM1, it is determined that the transmission source of the received data is not the communication restriction partner (step S13: NO), and the received data is passed to the processing unit 71 of the communication apparatus CS1.

Next, in step S14, the processing unit 71 of the communication apparatus CS1 performs predetermined processing according to the received data, and passes data (for example, response data) corresponding to the processing to the communication control unit 73 of the communication apparatus CS1. Next, the communication control unit 73 of the communication apparatus CS1 outputs the data and the identification information of the communication apparatus CM1 determined not to be the communication restriction partner to the first near field communication unit 1. Then, the first near field communication unit 1 of the communication apparatus CS1 transmits the data output from the communication control unit 73 to the communication apparatus CM1 by the first near field communication.

On the other hand, as illustrated in FIG. 6, for the communication apparatus CM2, none of the communication apparatuses CS1 to CS4 are in proximity to each other, and establishment of non-contact proximity communication is not performed. Therefore, in a case where the processing unit of the communication apparatus CM2 performs predetermined processing according to the operation instruction signal or the like, and transmits data according to the processing by the first near field communication, the communication control unit 73 of the communication apparatus CM2 specifies all the communication apparatuses CS1 to CS4 for which the link is established from the communication partner list as a communication partner whose communication restriction is not set (step S5). The identification information of each of the communication apparatuses CS1 to CS4 thus specified and the data according to the processing are output to the first near field communication unit 1. Then, the first near field communication unit 1 of the communication apparatus CM2 transmits the data output from the communication control unit 73 to each of the communication apparatuses CS1 to CS4 by the first near field communication.

Thus, the data transmitted from the communication apparatus CM2 by the first near field communication is received by the first near field communication unit 1 of each of the communication apparatuses CS1 to CS4, and is output to the communication control unit 73 of each of the communication apparatuses CS1 to CS4. The communication control unit 73 of each of the communication apparatuses CS1 to CS4 determines whether the transmission source of the received data is the communication restriction partner on the basis of the communication partner list (steps S13, S23, S33, S43). Since the communication control unit 73 of the communication apparatus CS1 sets the communication apparatus CM2 as the communication restriction partner in step S12, the communication control unit 73 determines that the transmission source of the received data is the communication restriction partner (step S13: YES), and makes a transition to error processing.

On the other hand, since the communication control unit 73 of each of the communication apparatuses CS2 to CS4 does not set the communication apparatus CM2 as a communication restriction partner, the communication control unit 73 determines that the transmission source of the received data is not the communication restriction partner (steps S23, S33, S43: NO). Then, the communication control unit 73 of each of the communication apparatuses CS2 to CS4 performs predetermined processing according to the received data, and passes data according to the processing to the communication control unit 73 of each of the communication apparatuses CS2 to CS4. Next, the communication control unit 73 of each of the communication apparatuses CS2 to CS4 outputs the data and the identification information of the communication apparatus CM2 determined not to be the communication restriction partner to the first near field communication unit 1. Then, the first near field communication unit 1 of each of the communication apparatuses CS2 to CS4 transmits the data output from the communication control unit 73 to the communication apparatus CM2 by the first near field communication.

Thereafter, in a case where the communication apparatus CM1 and the communication apparatus CS2 are approach each other to be within the second communicable range of each other, the second near field communication unit 2 of the communication apparatus CM1 and the second near field communication unit 2 of the communication apparatus CS2 mutually detect to establish non-contact proximity communication, and exchange pieces of identification information of each other. As a result, the proximity communication detection unit 72 of the communication apparatus CM1 acquires the identification information of the communication apparatus CS2, and detects that the communication apparatus CS2 has entered the second communicable range. That is, it is further detected that the communication apparatus CS2 whose communication restriction is set in step S2 has entered the second communicable range. Next, while maintaining the establishment of the link with each of the communication apparatuses CS1 to CS4, the communication control unit 73 of the communication apparatus CM1 removes the communication restriction setting for the communication apparatus CS2 using the identification information of the communication apparatus CS2 whose entrance to the second communicable range has been further detected, and the communication partner list, and updates the communication restriction setting so as to set the communication apparatuses CS1, CS3, and CS4 as the communication restriction partners. On the other hand, the proximity communication detection unit 72 of the communication apparatus CS2 acquires the identification information of the communication apparatus CM1, and detects that the communication apparatus CM1 has entered the second communicable range. Next, while maintaining the establishment of the link with each of the communication apparatuses CM1 to CM4, the communication control unit 73 of the communication apparatus CS2 sets the communication apparatuses CM2 to CM4 as the communication restriction partners using the identification information of the communication apparatus CM1 and the communication partner list. Note that the processing when the processing unit 71 of the communication apparatus CM1 performs predetermined processing according to the operation instruction signal or the like after the setting is similar to that of the communication apparatus CS1 as described above.

As described above, according to the communication system S, in an arbitrary time zone such as a time zone in which particularly quick processing is required in at least one of the two specific communication apparatuses C, a time zone in which it is particularly required to prevent false recognition or confusion of the user who uses the communication apparatus C, or a time zone in which it is necessary to prevent the outflow of information exchanged between two specific communication apparatuses C, while the establishment of a link between a specific communication apparatus C and each of a plurality of communication partners is maintained, transmission and reception of data by the first near field communication with the other communication partner not performing the first near field communication can be efficiently restricted in an arbitrary time zone.

Furthermore, according to the communication system S, for example, each of the communication apparatuses CS2 to CS4 set as communication restriction partners by the communication apparatus CM1 can perform the first near field communication with the communication apparatuses CM2 to CM4, and, in addition, the communication restriction setting can be performed such that the first near field communication is performed with any one of the communication apparatuses CM2 to CM4, so that the convenience of the entire communication system S can be improved.

[4. Power Supply Restriction Operation of Communication Apparatus C]

Next, referring to FIG. 7, the power supply restriction operation of the communication apparatus C will be explained. FIG. 7 is a flowchart illustrating an example of power supply restriction processing in the control unit 7 of the communication apparatus C. The communication control unit 73 of the communication apparatus C monitors the execution of the first near field communication, and when detecting that the first near field communication is not performed with any of the plurality of communication partners for which the link is established, starts the processing illustrated in FIG. 7.

When the processing illustrated in FIG. 7 is started, the communication control unit 73 starts incrementing the count value of the timer (that is, measuring the duration of the state where the first near field communication is not performed) (step S51). Next, the communication control unit 73 determines whether the first near field communication has started with any of the plurality of communication partners for which the link is established (step S52). in a case where the communication control unit 73 determines that the first near field communication has started with any of the plurality of communication partners for which the link is established (step S52: YES), resets a timer count value (that is, to 0) (step S53), and ends the processing illustrated in FIG. 7. On the other hand, in a case where the communication control unit 73 determines that the first near field communication is not started with any of the plurality of communication partners for which the link is established (step S52: NO), the process proceeds to step S54.

In step S54, the communication control unit 73 determines whether the timer count value (measurement time) has reached a predetermined time (a time set in advance). In a case where the communication control unit 73 determines that the timer count value has not reached the predetermined time (step S54: NO), the process returns to step S52. On the other hand, in a case where the communication control unit 73 determines that the timer count value has reached the predetermined time (step S54: YES), the process proceeds to step S55.

In step S55, the communication control unit 73 determines whether communication restriction setting has been made for any of the plurality of communication partners for which the link is established. In a case where the communication control unit 73 determines that the communication restriction setting is made for any of the plurality of communication partners for which the link is established (step S55: YES), the communication control unit 73 resets the communication restriction setting (resets the communication restriction presence and absence value to "0") (step S56), and the process proceeds to step S57. On the other hand, in a case where the communication control unit 73 determines that the communication restriction setting is not made for any of the plurality of communication partners for which the link is established (step S55: NO), the process proceeds to step S57.

In step S57, while maintaining the establishment of the link with each of the plurality of communication partners for which the link is established, the communication control unit 73 performs the power supply restriction and ends the processing illustrated in FIG. 7. In this power supply restriction, as described above, the power consumption mode of the battery 6 is switched from the normal mode to the power saving mode. Note that, in the power saving mode, the power supply from the battery 6 to the units other than the control unit 7 may be turned off, and even in this case, the second near field communication unit 2 may be activated by the power due to electromagnetic induction. Thereafter, in a case where it is detected that any one of the plurality of communication partners for which the link is established has entered the second communicable range, the communication control unit 73 switches the power consumption mode of the battery 6 from the power saving mode to the normal mode, and performs communication restriction setting as described above using the detected identification information of the communication partner and the communication partner list.

As described above, according to the power supply restriction operation of the communication apparatus C, while preventing the power consumption of the battery 6, transmission and reception of data by first near field communication with communication partners that not performing first near field communication can be efficiently restricted in an arbitrary time zone.

[5. Application Example of Communication System S]

Next, referring to FIG. 8 or the like, the example of a case applying the above-described communication system S to a settlement system SS in a shop (for example, restaurant) will be described. FIG. 8 is a figure illustrating an example of a schematic configuration of the settlement system SS. In the example of FIG. 8, the settlement system SS comprises a settlement processing terminal Tn (n=1, 2, 3, 4), a card information processing terminal Rm (m=1, 2, 3, 4), a settlement management server SE, and the like. For example, a smartphone, a tablet or the like is applied to the settlement processing terminal Tn. For example, a dedicated reader/writer or the like is applied to the card information processing terminal Rm.

The settlement processing terminal Tn has the same configuration and function as those of the above-described communication apparatus CMn. Furthermore, the application installed in the settlement processing terminal Tn includes an application for executing settlement processing. As a result, the processing unit 71 of the settlement processing terminal Tn executes settlement processing for a given payment amount (billing amount) for the visiting customer. This payment amount is calculated by the settlement processing terminal Tn, for example, on the basis of the price input to the settlement processing terminal Tn according to the order of the customer. Furthermore, the settlement processing is performed by a settlement method designated by the customer. The types of settlement methods include credit settlement and electronic money settlement. Note that electronic money settlement includes electronic money settlement by server prepaid type electronic money, and electronic money settlement by stored value prepaid type electronic money.

The card information processing terminal Rm has the same configuration and function as those of the above-described communication apparatus CSm, and further comprises a card insertion unit and a contact communication interface unit (not illustrated). A settlement card CA mounted with an IC chip is inserted to the card insertion unit. Examples of the settlement card CA include a credit card, an electronic money card and the like of a visiting customer. When the settlement card CA is inserted to the card insertion unit, the settlement card CA and the IC chip are electrically connected through terminals. As a result, the contact communication interface unit can perform contact communication with the IC chip of the settlement card CA inserted to the card insertion unit. Furthermore, the application installed in the card information processing terminal Rm includes an application for executing card information processing. As a result, the processing unit 71 of the card information processing terminal Rm executes card information processing including reading out the card information recorded in the nonvolatile memory of the IC chip of the settlement card CA and processing the read out card information. For example, in a case where the settlement card CA is a credit card, the card information includes a credit card number, the name of the issue target of the credit card, the expiration date of the credit card, and the like. Furthermore, in a case where the settlement card CA is a server prepaid type electronic money compatible electronic money card, the card information includes an electronic money card number and the like. On the other hand, in a case where the settlement card CA is a stored value prepaid type electronic money compatible electronic money card, the card information includes the balance of the electronic value corresponding to the monetary value, and the like.

The settlement management server SE comprises, for example, at least any one of a credit settlement management server and an electronic money settlement management server. Note that the settlement management server SE is connected to, for example, the Internet, and is used as necessary in settlement processing by the settlement processing terminal Tn. For example, the credit settlement management server is used for credit settlement. Furthermore, the electronic money settlement management server is used for electronic money settlement by server prepaid type electronic money. In the credit settlement management server, the credit card number, the name of the issue target of the credit card, the expiration date of the credit card, the credit limit amount (credit limit), the available amount, the account information of the issue target, and the like are stored in association with each issue target. Here, the credit limit amount is, for example, the upper limit allowable for the accumulation of shopping and cashing using a credit card. The available amount is the total amount of the credit card currently available (for example, the credit limit amount minus the current month's usage). The account information of the issue target includes the account number of the withdrawal account to which the payment amount for the credit settlement is debited, the financial institution ID identifying the financial institution that manages the account, and the like. Furthermore, in the electronic money settlement management server, the balance of the electronic value corresponding to the server prepaid type electronic money, the electronic money card number and the like are stored in association with each electronic money issue target.

Figure 9:
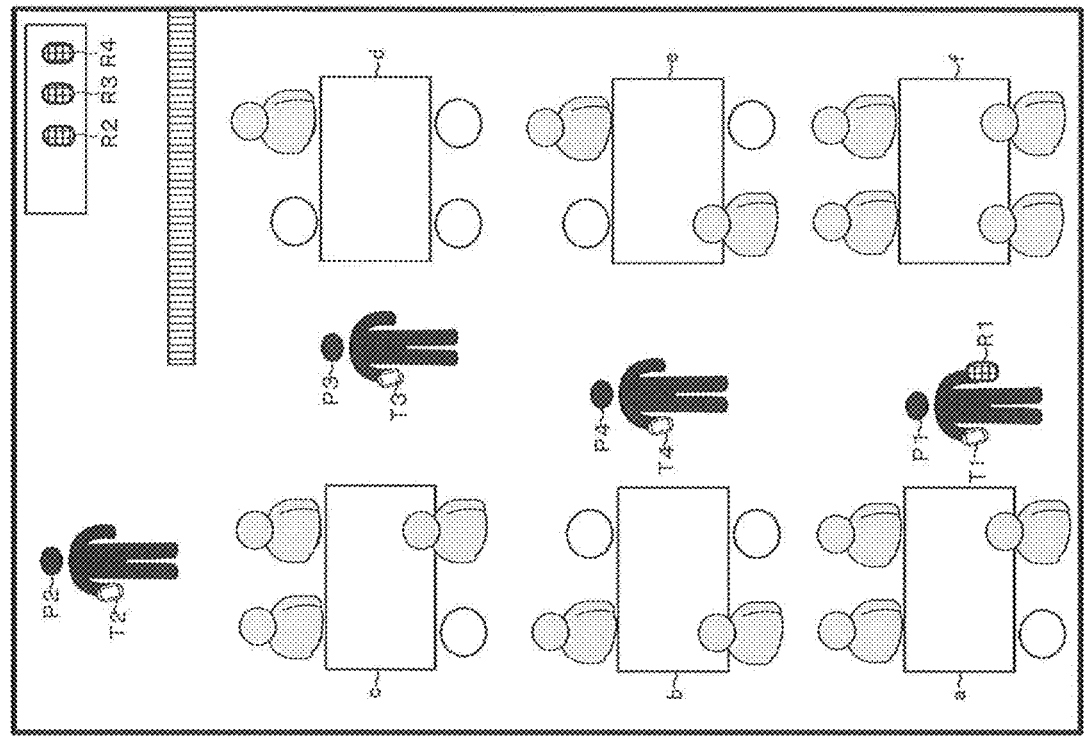
FIGS. 9 (A) and 9 (B) are conceptual figures illustrating an example of the inside of a store.
Figure 9:
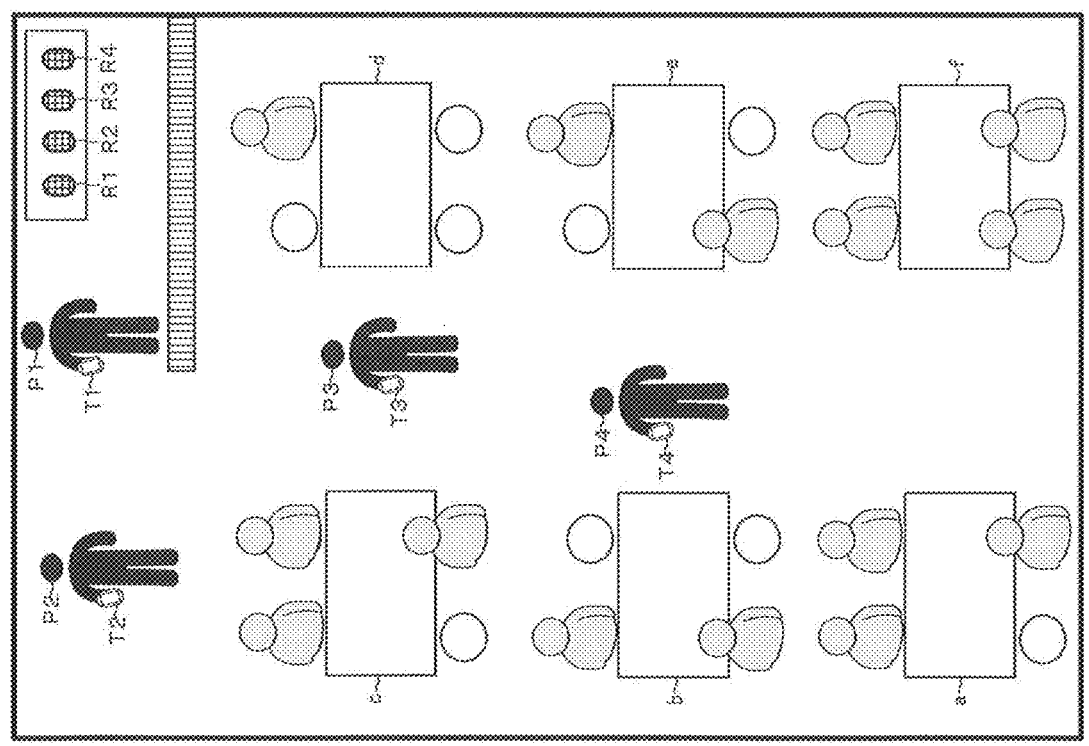

FIGS. 9A and 9 (B) are conceptual figures illustrating an example of the inside of a store. In payment settlement for a service provided by a store (for example, eating and drinking service), a pair of one settlement processing terminal Tn and one card information processing terminal Rm is used. For example, as illustrated in FIG. 9(A), the settlement processing terminals T1 to T4 are carried by the clerks P1 to P4, and the card information processing terminals R1 to R4 are collected and put on a table, for example, at a predetermined place in the store. Then, when settlement is performed in response to the request of the visiting customer (for example, when the customer finishes eating and is about to leave), the clerk P1 brings, for example, the card information processing terminal R1 among the card information processing terminals R1 to R4 out from the place, brings the card information processing terminal R1 and the settlement processing terminal T1, and goes to the table used by the customer. When the clerk P1 arrives at the table a used by the customer as illustrated in FIG. 9(B), the clerk P1 operates the operation and display unit 4 of the settlement processing terminal T1 to present the payment amount displayed on the screen to the customer. Then, the clerk P1 checks the settlement method to the customer, and receives the customer's settlement card CA.

Hereinafter, the operation of the settlement system SS when the settlement processing terminal T1 and the card information processing terminal R1 are used for settlement will be described. Note that the settlement processing terminal T1 establishes a link by pairing with each of the card information processing terminals R1 to R4, and the card information processing terminal R1 establishes a link by pairing with each of the settlement processing terminals T1 to T4.

Operation Example 1 of Settlement System SS

Figure 10:
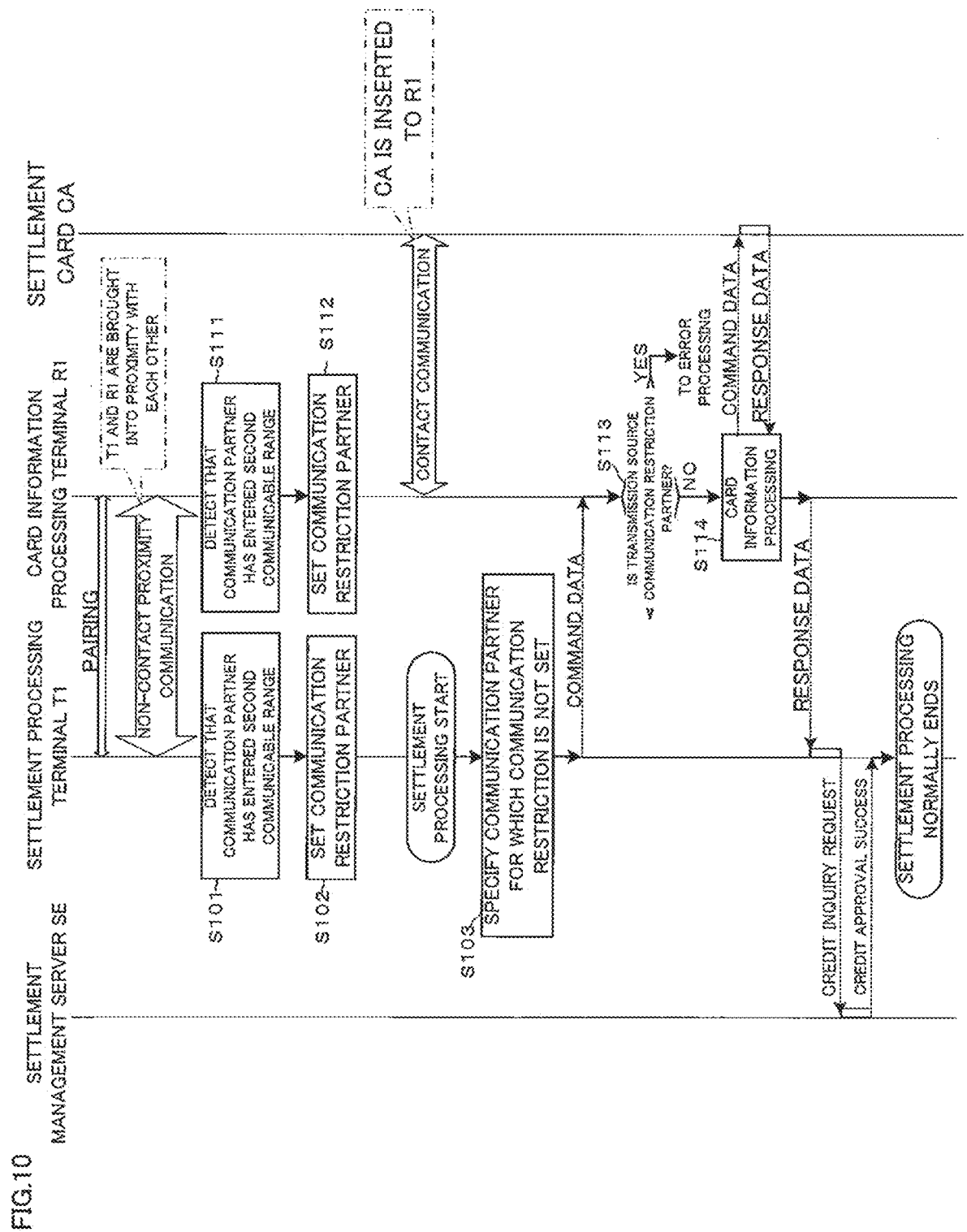
FIG. 10 is a sequence figure illustrating an example of operation of the settlement system SS in a case where the settlement method is credit settlement.

First, referring to FIG. 10, the operation of the settlement system SS in a case where the settlement method is the credit settlement will be described. FIG. 10 is a sequence figure illustrating an example of operation of the settlement system SS in a case where the settlement method is credit settlement.

In a case where the clerk P1 brings the card information processing terminal R1 out, and then brings the settlement processing terminal T1 and the card information processing terminal R1 into proximity with each other to be within the second communicable range of each other, as illustrated in FIG. 10, the second near field communication unit 2 of the settlement processing terminal T1 and the second near field communication unit 2 of the card information processing terminal R1 mutually detect to establish non-contact proximity communication, and exchange pieces of identification information of each other. As a result, the proximity communication detection unit 72 of the settlement processing terminal T1 acquires the identification information of the card information processing terminal R1, and detects that the card information processing terminal R1 has entered the second communicable range (step S101).

Next, while maintaining the establishment of the link with each of the card information processing terminals R1 to R4, the communication control unit 73 of the settlement processing terminal T1 sets the card information processing terminals R2 to R4 as communication restriction partners using the identification information of the card information processing terminal R1 detected in step S101, and the communication partner list (step S102). Such communication restriction setting is maintained even in a case where the settlement processing terminal T1 and the card information processing terminal R1 are out of the second communicable range of each other.

On the other hand, the proximity communication detection unit 72 of the card information processing terminal R1 acquires the identification information of the settlement processing terminal T1, and detects that the settlement processing terminal T1 has entered the second communicable range (step S111). Next, while maintaining the establishment of the link with each of the settlement processing terminals T1 to T4, the communication control unit 73 of the card information processing terminal R1 sets the settlement processing terminals T2 to T4 as communication restriction partners using the identification information of the settlement processing terminal T1 detected in step S111 and the communication partner list (step S112).

Note that the clerk P1 can also bring the settlement processing terminal T1 into proximity with the card information processing terminal R1 placed on the table, for example, before bringing out the card information processing terminal R1. Considering this case, in a case where the settlement processing terminal T1 detects that the card information processing terminal R1 has entered the second communicable range, the settlement processing terminal T1 may acquire the remaining power amount of the battery 6 of the card information processing terminal R1, for example, by the second near field communication, and in a case where the acquired remaining power amount is less than a threshold, the settlement processing terminal T1 may notify that the remaining power amount of the battery 6 of the card information processing terminal R1 is small. As a result, the clerk P1 can use the card information processing terminal Rm whose remaining power amount is equal to or more than the threshold, other than the card information processing terminal R1, for settlement. In other words, it is possible to exclude a communication partner whose remaining power amount of the battery 6 is less than a threshold as a communication partner whose transmission and reception of data by the first near field communication is not restricted.

The clerk P1 inserts the settlement card CA (a credit card in the example of FIG. 10) received from the customer to the card insertion unit of the card information processing terminal R1, and lets the customer enter the password from the operation and display unit 4 of the card information processing terminal R1. The card information processing terminal R1 authenticates the settlement card CA according to the input password, and when the authentication is successful, contact communication is established between the card information processing terminal R1 and the IC chip of the settlement card CA. Then, when the clerk P1 issues an operation instruction to execute settlement processing by the settlement method designated by the customer, from the operation and display unit 4 of the settlement processing terminal T1, the processing unit 71 of the settlement processing terminal T1 starts the settlement processing according to the operation instruction signal.

When the settlement processing is started, the processing unit 71 of the settlement processing terminal T1 generates command data indicating a read command according to the operation instruction signal, and passes the generated command data to the communication control unit 73. Then, the communication control unit 73 of the settlement processing terminal T1 specifies the card information processing terminal R1 as the communication partner whose communication restriction is not set, from the communication partner list (step S103). The identification information of the card information processing terminal R1 thus specified and the command data indicating the read command are output to the first near field communication unit 1. Then, the first near field communication unit 1 of the settlement processing terminal T1 transmits command data indicating the read command output from the communication control unit 73 to the card information processing terminal R1 by the first near field communication.

In this way, the command data transmitted from the settlement processing terminal T1 by the first near field communication is received by the first near field communication unit 1 of the card information processing terminal R1, and output to the communication control unit 73 of the card information processing terminal R1. The communication control unit 73 of the card information processing terminal R1 determines whether the transmission source of the received command data is the communication restriction partner on the basis of the communication partner list (step S113). In the example of FIG. 10, since the transmission source of the received command data is the settlement processing terminal T1, it is determined that the transmission source of the received command data is not the communication restriction partner (step S113: NO), and the received command data is passed to the processing unit 71 of the card information processing terminal R1.

Next, in step S114, the processing unit 71 of the card information processing terminal R1 performs the card information processing according to the read command indicated by the received command data to transmit command data indicating the read command to the settlement card CA via the contact communication interface unit. The IC chip of the settlement card CA reads the card information from the non-volatile memory according to the read command indicated by the received command data, and transmits response data including the read card information to the card information processing terminal R1. The card information includes a credit card number, the name of the issue target of the credit card, the expiration date of the credit card, and the like.

Next, the processing unit 71 of the card information processing terminal R1 passes the response data received from the settlement card CA via the contact communication interface unit to the communication control unit 73 of the card information processing terminal R1. Next, the communication control unit 73 of the card information processing terminal R1 outputs, to the first near field communication unit 1, the response data and the identification information of the settlement processing terminal T1 determined not to be the communication restriction partner. Then, the first near field communication unit 1 of the card information processing terminal R1 transmits the response data output from the communication control unit 73 to the settlement processing terminal T1 by the first near field communication.

Thus, the response data transmitted from the card information processing terminal R1 by the first near field communication is received by the first near field communication unit 1 of the settlement processing terminal T1, and output to the processing unit 71 via the communication control unit 73. Then, the processing unit 71 of the settlement processing terminal T1 generates data indicating a credit inquiry (also referred to as authorization or authori) request, and passes the data indicating the generated credit inquiry request to the communication control unit 73. The data indicating the credit inquiry request includes card information included in response data received from the card information processing terminal R1, settlement amount information indicating the settlement amount, and the like. Then, the communication control unit 73 of the settlement processing terminal T1 accesses the settlement management server SE via the mobile wireless communication unit 3, and transmits the data indicating the credit inquiry request to the settlement management server SE (credit settlement management server) via the mobile wireless communication unit 3.

The settlement management server SE makes a credit inquiry as to whether or not credit settlement is possible, in accordance with data indicating a credit inquiry request from the settlement processing terminal T1. Then, for example, in a case where the expiration date of the credit card has not passed and the payment amount indicated by the payment amount information does not exceed the available amount, the settlement management server SE transmits data indicating credit approval success to the settlement processing terminal T1. Thus, when the data indicating the credit approval success is received from the settlement management server SE by the settlement processing terminal T1, the settlement processing ends normally. On the other hand, for example, in a case where the expiration date of the credit card has passed, or in a case where the payment amount indicated by the payment amount information exceeds the available amount, data indicating credit approval failure is transmitted to the settlement processing terminal T1. As a result, the settlement processing abnormally ends, and an error message is notified from the settlement processing terminal T1.

When the settlement processing ends, the clerk P1 returns the card information processing terminal R1 to the original predetermined place. Thereafter, for example, in a case where the clerk P2 brings out the card information processing terminal R1, if the settlement processing terminal T2 of the clerk P2 and the card information processing terminal R1 are brought into proximity with each other, while maintaining the establishment of the link, the card information processing terminal R1 removes the communication restriction setting for the settlement processing terminal T2 whose entrance to the second communicable range has been further detected, and updates the communication restriction setting so as to set the settlement processing terminals T1, T3 and T4 as the communication restriction partners (the subsequent processing is similar to that in the case of the clerk P1).

Note that the settlement processing terminal T1 may reset all the communication restriction settings (that is, remove the restriction of the transmission and reception of data with all the communication restriction partners) at the timing when the settlement processing ends. In addition, at this time, the settlement processing terminal T1 may transmit command data indicating a reset command of communication restriction setting to the card information processing terminal R1 by the first near field communication. In this case, the card information processing terminal R1 resets all of the communication restriction settings according to the reset command indicated by the received command data, and transmits the response data indicating the reset completion to the settlement processing terminal T1 by the first near field communication.

Operation Example 2 of Settlement System SS

Figure 11:
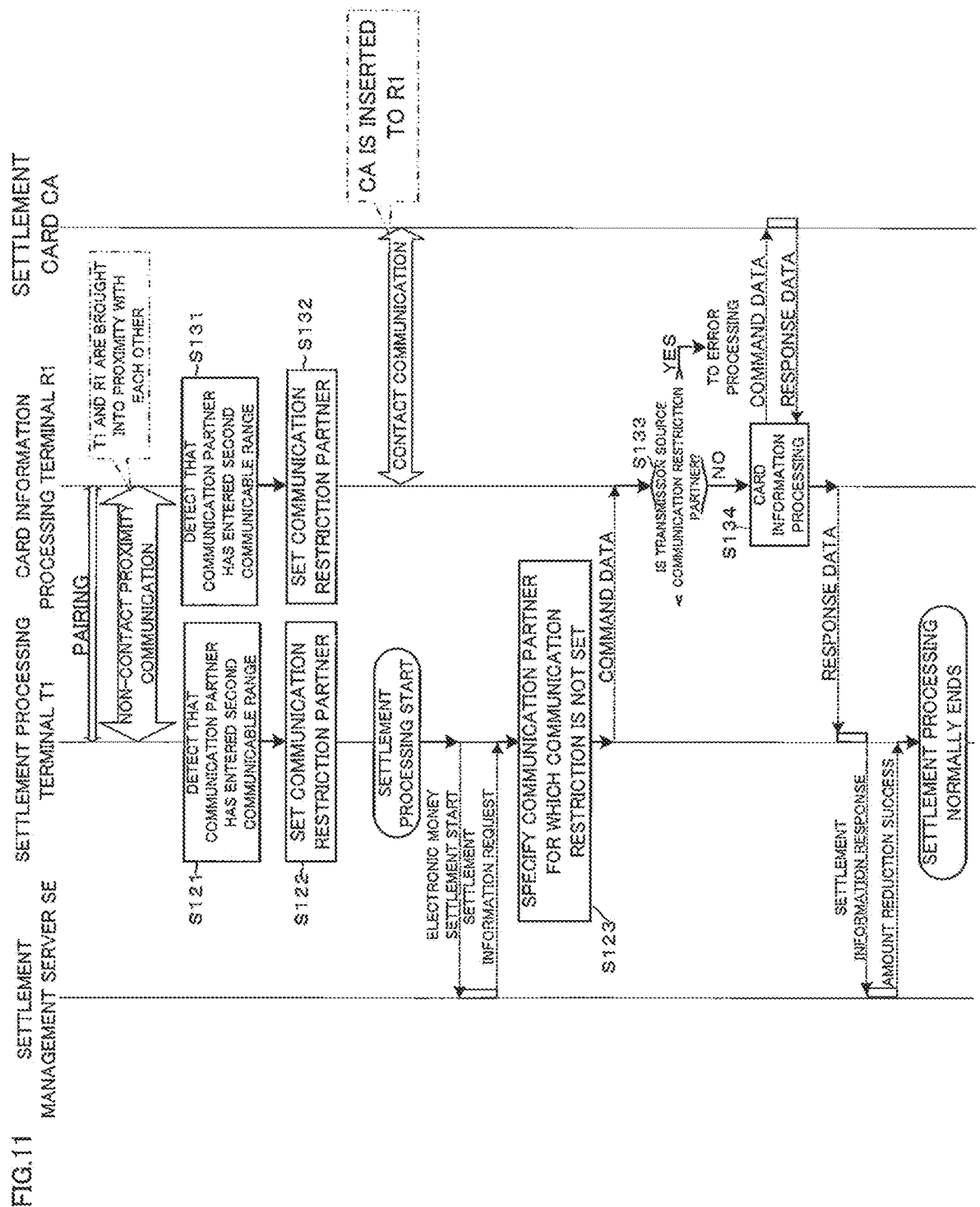
FIG. 11 is a sequence figure illustrating an example of the operation of the settlement system SS in a case where the settlement method is electronic money settlement by server prepaid type electronic money.

Next, referring to FIG. 11, operation of the settlement system SS in the case where the settlement method is electronic money settlement by server prepaid type electronic money will be described. FIG. 11 is a sequence figure illustrating an example of the operation of the settlement system SS in a case where the settlement method is electronic money settlement by server prepaid type electronic money. Note that the processing of steps S121 to S122 illustrated in FIG. 11 is similar to the processing of steps S101 to S102 illustrated in FIG. 10. Furthermore, the processing of steps S131 to S132 illustrated in FIG. 11 is similar to the processing of steps S111 to S112 illustrated in FIG. 10.

The clerk P1 inserts the settlement card CA (an electronic money card in the example of FIG. 11) received from the customer to the card insertion unit of the card information processing terminal R1, and lets the customer enter the password from the operation and display unit 4 of the card information processing terminal R1. The card information processing terminal R1 authenticates the settlement card CA according to the input password, and when the authentication is successful, contact communication is established between the card information processing terminal R1 and the IC chip of the settlement card CA. Then, when the clerk P1 issues an operation instruction to execute settlement processing by the settlement method designated by the customer, from the operation and display unit 4 of the settlement processing terminal T1, the processing unit 71 of the settlement processing terminal T1 starts the settlement processing according to the operation instruction signal.

When the settlement processing is started, the processing unit 71 of the settlement processing terminal T1 generates data indicating the start of electronic money settlement, and passes the generated data indicating the start of electronic money settlement to the communication control unit 73. Then, the communication control unit 73 of the settlement processing terminal T1 accesses the settlement management server SE via the mobile wireless communication unit 3, and transmits the data indicating the start of electronic money settlement to the settlement management server SE (electronic money settlement management server) via the mobile wireless communication unit 3.

The settlement management server SE transmits data indicating a settlement information request to the settlement processing terminal T1 according to the data indicating the start of electronic money settlement from the settlement processing terminal T1. Thus, the data indicating the settlement information request transmitted from the settlement management server SE is received by the mobile wireless communication unit 3 of the settlement processing terminal T1, and is output to the processing unit 71 via the communication control unit 73. Then, the processing unit 71 of the settlement processing terminal T1 generates command data indicating a read command according to the data indicating the settlement information request, and passes the generated command data to the communication control unit 73. Then, the communication control unit 73 of the settlement processing terminal T1 specifies the card information processing terminal R1 as the communication partner whose communication restriction is not set, from the communication partner list (step S123). The identification information of the card information processing terminal R1 thus specified and the command data indicating the read command are output to the first near field communication unit 1. Then, the first near field communication unit 1 of the settlement processing terminal T1 transmits command data indicating the read command output from the communication control unit 73 to the card information processing terminal R1 by the first near field communication.

In this way, the command data transmitted from the settlement processing terminal T1 by the first near field communication is received by the first near field communication unit 1 of the card information processing terminal R1, and output to the communication control unit 73 of the card information processing terminal R1. The communication control unit 73 of the card information processing terminal R1 determines whether the transmission source of the received command data is the communication restriction partner on the basis of the communication partner list (step S133). In the example of FIG. 11, since the transmission source of the received data is the settlement processing terminal T1, it is determined that the transmission source of the received command data is not the communication restriction partner (step S133: NO), and the received command data is passed to the processing unit 71 of the card information processing terminal R1.

Next, in step S134, the processing unit 71 of the card information processing terminal R1 performs the card information processing according to the read command indicated by the received command data to transmit command data indicating the read command to the settlement card CA via the contact communication interface unit. The IC chip of the settlement card CA reads the card information from the non-volatile memory according to the read command indicated by the received command data, and transmits response data including the read card information to the card information processing terminal R1. The card information includes an electronic money card number and the like.

Next, the processing unit 71 of the card information processing terminal R1 passes the response data received from the settlement card CA via the contact communication interface unit to the communication control unit 73 of the card information processing terminal R1. Next, the communication control unit 73 of the card information processing terminal R1 outputs, to the first near field communication unit 1, the response data and the identification information of the settlement processing terminal T1 determined not to be the communication restriction partner. Then, the first near field communication unit 1 of the card information processing terminal R1 transmits the response data output from the communication control unit 73 to the settlement processing terminal T1 by the first near field communication.

Thus, the response data transmitted from the card information processing terminal R1 by the first near field communication is received by the first near field communication unit 1 of the settlement processing terminal T1, and output to the processing unit 71 via the communication control unit 73. Then, the processing unit 71 of the settlement processing terminal T1 generates data indicating a settlement information response, and passes the generated data indicating the settlement information response to the communication control unit 73. The data indicating the settlement information response includes card information included in response data received from the card information processing terminal R1, payment amount information indicating the payment amount, and the like. Then, the communication control unit 73 of the settlement processing terminal T1 transmits the data indicating the settlement information response to the settlement management server SE via the mobile wireless communication unit 3 via the mobile wireless communication unit 3.

The settlement management server SE specifies the balance of the electronic value of the electronic money issue target (the owner) according to the data indicating the settlement information response from the settlement processing terminal T1, from the electronic money card number indicated by the card information included in the data, to make a balance inquiry as to whether electronic money settlement is possible. Then, when the balance of the electronic value is equal to or more than the payment amount indicated by the payment amount information, the settlement management server SE reduces the balance of the electronic value by the payment amount, and transmits data indicating the reduction success of the electronic value to the settlement processing terminal T1. Thus, when the data indicating the reduction success of the electronic value is received from the settlement management server SE by the settlement processing terminal T1, the settlement processing ends normally. On the other hand, in a case where the balance of the electronic value is not equal to or more than the payment amount, data indicating the reduction failure of the electronic value is transmitted to the settlement processing terminal T1. As a result, the settlement processing abnormally ends, and an error message is notified from the settlement processing terminal T1.

Note that, although the example of FIG. 11 describes the operation of the settlement system SS in a case where the settlement method is electronic money settlement by server prepaid type electronic money, also in a case of the operation of the settlement system SS of a case where the settlement method is electronic money settlement by stored value prepaid type electronic money, the processing is basically similar to the processing of steps S121 to S123 and S131 to S134 illustrated in FIG. 11. However, in a case of electronic money settlement by stored value prepaid type electronic money, the settlement management server SE is not used, and the balance of the electronic value is reduced by the payment amount according to an instruction from the card information processing terminal R1, by the settlement card CA. Note that the transmission and reception of data between the settlement card CA and the card information processing terminal R1 may be performed by non-contact proximity communication.

As described above, according to the settlement system SS, for example, in an arbitrary time zone when the settlement processing terminal T1 and the card information processing terminal R1 are used for settlement, while each maintaining establishment of the link with each of the plurality of communication partners, the settlement processing terminal T1 and the card information processing terminal R1 can respectively and efficiently restrict transmission and reception of data by the first near field communication with another communication partner not performing the first near field communication in the arbitrary time zone. As a result, the settlement processing terminal T1 and the card information processing terminal R1 can perform quick processing, then it is possible to prevent particularly the false recognition or confusion of the user who uses the settlement processing terminal T1 and the card information processing terminal R1, and then it is possible to prevent the outflow of information exchanged between the settlement processing terminal T1 and the card information processing terminal R1. Furthermore, even in a case where, for example, settlements of a plurality of different customers are performed in the same time zone, it is possible to reliably prevent each settlement from being performed erroneously.

In addition, according to the settlement system SS, under the situation while the card information processing terminal R1 maintaining the establishment of the link with the settlement processing terminals T1 to T4 is commonly used by clerks and where the settlement processing terminal T1 maintaining the establishment of the link with the card information processing terminals R1 to R4 is carried by the clerk P1, transmission and reception of data by the first near field communication can be secured only between the card information processing terminal R1 and the settlement processing terminal T1 simply by bringing the settlement processing terminal T1 and the card information processing terminal R1 into proximity with each other.

Note that the communication system S is applicable not only to the settlement system SS but also to, for example, a security system in which a guard needs to use a pair of two communication apparatuses C in a facility or a building.

Furthermore, in the above embodiment, the case where the near field communication method based on BT is adopted as the first near field communication method has been described, but instead, a near field communication method based on a wireless LAN standard such as Wi-Fi (registered trademark) or ZIGBEE (registered trademark) may be adopted. Furthermore, in the above embodiment, the case where the near field communication method based on NFC is adopted as the second near field communication method has been described, but a near field communication method based on infrared data association (IrDA) technology or TransferJet (registered trademark) may be adopted. Furthermore, in the above embodiment, although a master apparatus and a slave apparatus in the near field communication method based on BT are assumed, the present invention is also applicable to a communication system in which there is no distinction between a master apparatus and a slave apparatus, that is, a communication system in which both of the two communication apparatuses can take the initiative in the first near field communication.

Furthermore, in the above embodiment, the case where the communication system S comprises the plurality of communication apparatuses CMm and the plurality of communication apparatuses CSm has been described as an example. However, the present invention is also applicable to a communication system in which one communication apparatus CMn and a plurality of communication apparatuses CSm are provided, one communication apparatus CMn establishes a link with each of the plurality of communication apparatuses CSm, and the first near field communication is performed with the communication apparatus CSm existing in the first communicable range. In this case, since each communication apparatus CSm naturally performs the first near field communication with only one communication apparatus CMn, there is no need to perform the above-described communication restriction setting (that is, in this case, only the communication apparatus CMn performs the above-described communication restriction setting). Furthermore, the present invention is also applicable to a communication system in which a plurality of communication apparatuses CMn and one communication apparatus CSm are provided, the plurality of communication apparatuses CMn establish a link with of one communication apparatus CSm, and the first near field communication is performed with the communication apparatus CSm existing in the first communicable range. In this case, since each communication apparatus CMn naturally performs the first near field communication with only one communication apparatus CSm, there is no need to perform the above-described communication restriction setting (that is, in this case, only the communication apparatus CSm performs the above-described communication restriction setting).

DESCRIPTION OF REFERENCE NUMERALS

1 First near field communication unit
2 Second near field communication unit
3 Mobile wireless communication unit
4 Operation and display unit
5 Storage unit
6 Battery
7 Control unit
71 Processing unit
72 Proximity communication detection unit
73 Communication control unit
C, CMn, CSm Communication apparatus
S Communication system

The invention claimed is:
1. A communication apparatus comprising:
first communication circuitry that establishes a link necessary for first near field communication with a communication partner existing in a first communicable range, and then performs the first near field communication with the communication partner for which the link is established;
second communication circuitry that performs second near field communication with a communication partner existing in a second communicable range narrower than the first communicable range;
at least one memory configured to store program code; and at least one processor configured to access the program code and operate as instructed by the program code, the program code including:

detection code configured to cause at least one of the at least one processor to detect that any one of a plurality of communication partners for which the link is established has entered the second communicable range; and communication control code configured to cause at least one of the at least one processor to, in a case where at least one of the at least one processor detects that the communication partner has entered the second communicable range, while maintaining establishment of the link with each of the plurality of communication partners for which the link is established, restrict transmission and reception of data by the first near field communication with the communication partners other than the communication partner whose entry into the second communicable range has been detected.

2. The communication apparatus according to claim 1, wherein, in a case where at least one of the at least one processor detects that the communication partner whose transmission and reception of data by the first near field communication is restricted has entered the second communicable range, while maintaining the establishment of the link with each of the plurality of communication partners for which the link is established, the communication control code causes at least one of the at least one processor to remove restriction of the transmission and reception of data with the communication partner whose entrance to the second communicable range has been further detected, and restrict transmission and reception of data by the first near field communication with the communication partners other than the communication partner whose restriction of the transmission and reception of data has been removed.

3. The communication apparatus according to claim 1, wherein the communication control code is configured to cause at least one of the at least one processor to not respond to a predetermined command by the first near field communication from the communication partner whose transmission and reception of data by the first near field communication is restricted.

4. The communication apparatus according to claim 1, further comprising a battery that supplies power to the communication apparatus, wherein, in a case where a state in which the first near field communication is not performed with any of the plurality of communication partners for which the link is established continues for a predetermined time, while maintaining establishment of the link with each of the plurality of communication partners for which the link is established, the communication control code causes at least one of the at least one processor to switch a power consumption mode of the battery from a normal mode to a power saving mode, and thereafter, in a case where the detection code causes at least one of the at least one processor to detect that any one of the plurality of communication partners for which the link is established has entered the second communicable range, the communication control code causes at least one of the at least one processor to switch the power consumption mode of the battery from the power saving mode to the normal mode, and restrict-transmission and reception of data by the first near field communication with the communication partners other than the communication partner whose entrance to the second communicable range has been detected.

5. The communication apparatus according to claim 4, wherein, in a case where the state in which the first near field communication is not performed with any of the plurality of communication partners for which the link is established continues for the predetermined time, while maintaining establishment of the link with each of the plurality of communication partners for which the link is established, the communication control code causes at least one of the at least one processor to switch a power consumption mode of the battery from a normal mode to a power saving mode, and remove the restriction with all the communication partners whose transmission and reception of data by the first near field communication has been restricted.

6. The communication apparatus according to claim 1, wherein, in a case where the detection code causes at least one of the at least one processor to detect that the communication partner has entered the second communicable range, the communication control code causes at least one of the at least one processor to acquire a remaining power amount of a battery of the communication partner whose entrance to the second communicable range has been detected, and in a case where the remaining power amount acquired is less than a threshold, the communication control code causes at least one of the at least one processor to notify that the remaining power amount of the battery of the communication partner is small.

7. A communication method performed by a computer, the communication method comprising:

establishing a link necessary for first near field communication with a communication partner existing in a first communicable range, and then performing the first near field communication with the communication partner for which the link is established;

performing second near field communication with a communication partner existing in a second communicable range narrower than the first communicable range;

detecting that any one of a plurality of communication partners for which the link is established has entered the second communicable range; and in a case where it is detected that the communication partner has entered the second communicable range, while maintaining establishment of the link with each of the plurality of communication partners for which the link is established, restricting transmission and reception of data by the first near field communication with the communication partners other than the communication partner whose entry into the second communicable range has been detected.

8. A non-transitory computer readable memory having stored thereon a communication processing program configured to cause a computer comprising: a first communication circuit that establishes a link necessary for first near field communication with a communication partner existing in a first communicable range, and then performs the first near field communication with the communication partner for which the link is established; and a second communication circuit that performs second near field communication with a communication partner existing in a second communicable range narrower than the first communicable range, to:

detect that any one of a plurality of communication partners for which the link is established has entered the second communicable range, and in a case where the communication partner has been detected to have entered the second communicable range, while maintaining establishment of the link with each of the plurality of communication partners for which the link is established, restrict transmission and reception of data by the first near field communication with the communication partners other than the communication partner whose entry into the second communicable range has been detected.

* * * * *